(12) United States Patent
Hawkins et al.

(10) Patent No.: US 10,776,687 B2
(45) Date of Patent: Sep. 15, 2020

(54) UNION PROCESSING OF SEQUENCES OF PATTERNS

(71) Applicant: Numenta, Inc., Redwood City, CA (US)

(72) Inventors: Jeffrey C. Hawkins, Atherton, CA (US); Yuwei Cui, Redwood City, CA (US)

(73) Assignee: Numenta, Inc., Redwood City, CA (US)

( * ) Notice: Subject to any disclaimer, the term of this patent is extended or adjusted under 35 U.S.C. 154(b) by 1108 days.

(21) Appl. No.: 15/060,119

(22) Filed: Mar. 3, 2016

(65) Prior Publication Data

US 2017/0255861 A1    Sep. 7, 2017

(51) Int. Cl.
*G06N 3/04* (2006.01)
*G06N 3/08* (2006.01)

(52) U.S. Cl.
CPC .......... *G06N 3/0454* (2013.01); *G06N 3/049* (2013.01); *G06N 3/088* (2013.01)

(58) Field of Classification Search
None
See application file for complete search history.

(56) References Cited

U.S. PATENT DOCUMENTS 8,645,291 B2 *   2/2014   Hawkins ............... G06F 9/3867
706/12

OTHER PUBLICATIONS

Lattner, Stefan "Hierarchical Temporal Memory, Investigations, Ideas, and Experiments." JKU, 2014. [Published 2014] [Retrieved online May 2019] <URL: https://www.researchgate.net/publication/269166828_Hierarchical_Temporal_Memory—Investigations_Ideas_and_Experiments> (Year: 2014).*
Byrne, Fergal "Encoding Reality: Prediction assisted Cortical Learning Algorithm in HTM" HTM Theory Group, Ireland [Published 2015] [Retrieved May 2019] <URL: https://arxiv.org/abs/1509.08255> (Year: 2015).*
Maxwell, James et al "Hierarchical sequential memory for Music: A cognitive model" ISMIR 2009 [Published 2009] [Retrieved online May 2019] <URL: http://ismir2009.ismir.net/proceedings/PS3-7.pdf> (Year: 2009).*

(Continued)

*Primary Examiner* — Ann J Lo
*Assistant Examiner* — Fen Christopher Tamulonis
(74) *Attorney, Agent, or Firm* — Fenwick & West LLP

(57) ABSTRACT

Embodiments relate to a processing node of a hierarchical temporal memory (HTM) system with a union processor that enables a more stable representation of sequences by unionizing or pooling patterns of a temporal sequence. The union processor biases the HTM system so a learned temporal sequence may be more quickly recognized. The union processor includes union elements that are associated with incoming spatial patterns or with cells that represent temporal relationships between the spatial patterns. A union element of the union processor may be activated if a persistence score of the union element satisfies a predetermined criterion. The persistence score of the detector is updated based on the activation states of the spatial patterns or cells associated with the detector. After activation, the union element remains active for a period longer than a time step for performing the spatial pooling.

35 Claims, 15 Drawing Sheets

(56) References Cited

OTHER PUBLICATIONS

Hawkins, Jeff "Temporal Pooling: a "fireside chat" with Jeff Hawkins" Spring NuPIC Hackathon 2014 [Published online May 2014] [Retrieved online May 2019] <URL: https://www.youtube.com/watch?v=dDtwK9JYK94> (Year: 2014).*
Ahmad, S. et al., "How do neurons operate on sparse distributed representations? A mathematical theory of sparsity, neurons and active dendrites", Numenta, Inc., Redwood City, CA, Jan. 5, 2016, 17 pages.
Ahmad, S. et al., "Properties of Sparse Distributed Representations and their Application to Hierarchical Temporal Memory", Numenta, Inc., Redwood City, CA, Mar. 24, 2015, 18 pages.
Billaudelle, A. et al., "Porting HTM Models to the Heidelberg Neuromorphic Computing Platform", Numenta, Inc., Redwood City, CA, version 2, Feb. 9, 2016, nine pages.
Billaudelle, A. et al., "Porting HTM Models to the Heidelberg Neuromorphic Computing Platform", Numenta, Inc., Redwood City, CA, version 1, May 8, 2015, ten pages.
Cui, Y, et al., "Continuous online sequence learning with an unsupervised neural network model", Numenta, Inc., Redwood City, CA, Dec. 10, 2015, 13 pages.
Hawkins, J. et al., "Why Neurons Have Thousands of Synapses, A Theory of Sequence Memory in Neocortex", Numenta, Inc., Redwood City, CA, version 2, Dec. 1, 2015, 20 pages.
Hawkins, J. et al., "Why Neurons Have Thousands of Synapses, A Theory of Sequence Memory in Neocortex", Numenta, Inc., Redwood City, CA, version 1, Oct. 30, 2015, 20 pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 4, Nov. 17, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 3, Nov. 16, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 2, Oct. 13, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 1, Oct. 12, 2015, eight pages.
MIT Technology Review, "Single Artificial Neuron Taught to Recognize Hundreds of Patterns," Nov. 12, 2015, six pages. [Online] [Retrieved Nov. 18, 2015] Retrieved from the internet <http://www.technologyreview.com/...etter&utm_campaign=ef674243f3-Newsletter_Nov._2015_11_16_2015&utm_medium=email&utm_term=0_23e65d3407-ef674243f3-303250977>.
Purdy, S., "Encoding Data for HTM Systems", Numenta, Inc., Redwood City, CA, Feb. 18, 2016, 11 pages.

* cited by examiner

UNION PROCESSING OF SEQUENCES OF PATTERNS

BACKGROUND

1. Field of the Disclosure

The present disclosure relates to learning and processing spatial patterns and temporal sequences in a temporal memory system.

2. Description of the Related Arts

Hierarchical Temporal Memory (HTM) systems represent a new approach to machine intelligence. In an HTM system, training data including temporal sequences and/or spatial patterns are presented to a network of nodes. The HTM network then builds a model of the statistical structure inherent to the spatial patterns and temporal sequences in the training data, and thereby learns the underlying 'causes' of the temporal sequences of patterns and sequences in the training data. The hierarchical structures of the HTM system enables modeling of very high dimensional input spaces using reasonable amounts of memory and processing capacity.

The training process of the HTM system is largely a form of unsupervised machine learning. During a training process, one or more processing nodes of the HTM system form relationships between temporal sequences and/or spatial patterns present in training input and their associated causes or events. During the learning process, indexes indicative of the cause of events corresponding to the training input may be presented to the HTM system to allow the HTM system to associate particular categories, causes, or events with the training input.

Once an HTM system has built a model of a particular input space, it can perform inference or prediction. To perform inference or prediction, a novel input including temporal sequences or spatial patterns is presented to the HTM system. During the inference stage, each node in the HTM system produces an output that can be more invariant and temporally stable than its input. In other words, the output from a node in the HTM system is more abstract and invariant compared to its input. At its highest node, the HTM system will generate an output indicative of the underlying cause or event associated with the novel input.

SUMMARY

Embodiments relate to a processing node for temporally processing input data. The input data has a plurality of elements having their activation states change over time. Spatial pooling is performed on the input data by selecting, for each time step, elements in a series of vectors to be activated based on active elements of the input data mapped to the elements in the vectors. Each of the vectors is in sparse distributed representation. The processing node generates an output data having one or more elements activated based on the selected elements in each of the vectors. The activated elements in the output data remaining active for a duration longer than the time step.

Embodiments also relate to a processing node having a sequence processor with its state updated responsive to receiving input data for each time step. The state information represents the updated state of the sequence processor and indicates detection or prediction of temporal sequences in the input data. The one or more elements in the output data activated based on activation of elements of the state information mapped to the one or more elements in the output data. An output data having one or more elements is generated. The output data is activated based on the activation of elements of the state information mapped to the one or more elements in the output data. The activated elements in the output data remaining active for a duration longer than the time step.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

Figures 1A, 1B:
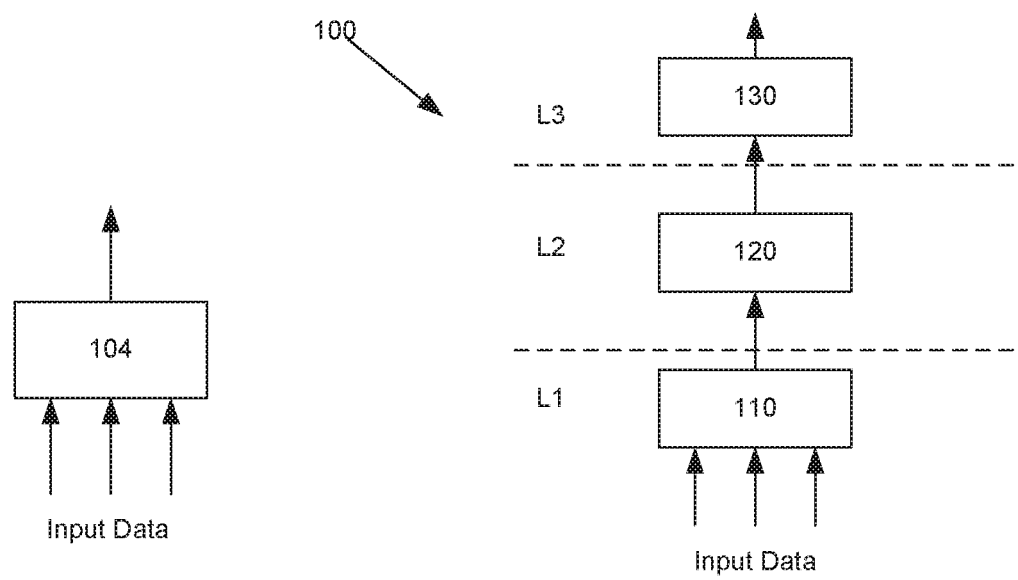
FIG. 1A is a conceptual diagram of a single processing node in a non-hierarchical system, according to one embodiment.
FIG. 1B is a conceptual diagram illustrating an hierarchical temporal memory (HTM) system including three layers of processing nodes, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to a processing node that generates a more stable representation of temporal sequences in input data by unionizing or pooling spatial patterns of a temporal sequence. Spatial pooling is performed on the input data by selecting a subset of elements in a vector where each element of the vector is mapped to one or more elements of the input data. Output data from the processing node may have its elements activated based on elements in the vector selected for activation. After an element of the output data is activated, the element remains active longer than a time step for processing the input data at the processing node. As a result, the output data becomes a unionized version of the vector or an intermediate data that is derived by temporally processing the vector.

Architecture of Temporal Memory System

A temporal memory system stores temporal relationships in sequences of spatial patterns and generates useful information based on the stored relationships. The useful information may include, for example, prediction of spatial patterns to be received, identification of spatial patterns, or a higher level cause associated with the spatial patterns in input data. The temporal memory system may be of a non-hierarchical structure or be of a hierarchical structure.

FIG. 1A is a conceptual diagram of a single processing node 104 in a non-hierarchical system. The processing node 104 receives input data, processes temporal sequences in the input data and generates an output. The output of the processing node 104 is based on the temporal relationships between spatial patterns. For example, the output may indicate prediction on what spatial patterns are to follow or indicate how well the prediction matched a subsequent spatial pattern in the input data.

FIG. 1B is a conceptual diagram of processing nodes organized in a hierarchical manner. Such a hierarchically structured temporal memory system is referred to as a Hierarchical Temporal Memory (HTM) system. In an HTM system, multiple processing nodes learn, predict, and infer input at different levels of abstraction. An example HTM system 100 of FIG. 1B comprises three levels where each level L1, L2, and L3 includes one processing node 110, 120, and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

The HTM system 100 has three levels L1, L2, and L3, where level L1 is the lowest level, level is L3 is the highest level, and level L2 is an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 4. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of the functions performed by a processing node include, for example, spatial pooling and temporal processing. Spatial pooling herein refers to the process of mapping a set of distinct but similar spatial patterns into a spatial co-occurrence. Temporal processing may include, but is not limited to, learning temporal sequences, performing inference, recognizing temporal sequences, predicting temporal sequences, labeling temporal sequences, and temporal pooling. Learning temporal sequences herein refers to one or more of initializing, expanding, contracting, merging, and splitting temporal sequences. Predicting temporal sequences herein refers to assessing the likelihood that certain spatial patterns will appear subsequently in the input data. Temporal pooling herein refers to processing input data to provide an output that is more stable and invariable over time compared to spatial patterns in the input data. Hardware, software, firmware, or a combination thereof for performing spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

The processing nodes of the HTM system may be arranged so that the number of processing nodes decreases as level increases. FIG. 2A is a diagram illustrating HTM system 200 having three levels L1, L2, and L3, where level L1 is the lowest level, level L3 is the highest level, and level L2 is an intermediate level between levels L1 and L3. HTM system 200 is hierarchically structured so that the processing nodes cover a larger input space as the level ascends. Level L1 has nodes 210A, 210B, 210C, and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy and propagates top-down signals down the hierarchy. That is, each processing node 210A, 210B, 210C, 210D, 220A, 220B, and 230 may be arranged (i) to propagate information up the HTM hierarchy to a connected parent node, and (ii) to propagate information down the HTM hierarchy to any connected children nodes.

Figure 2:
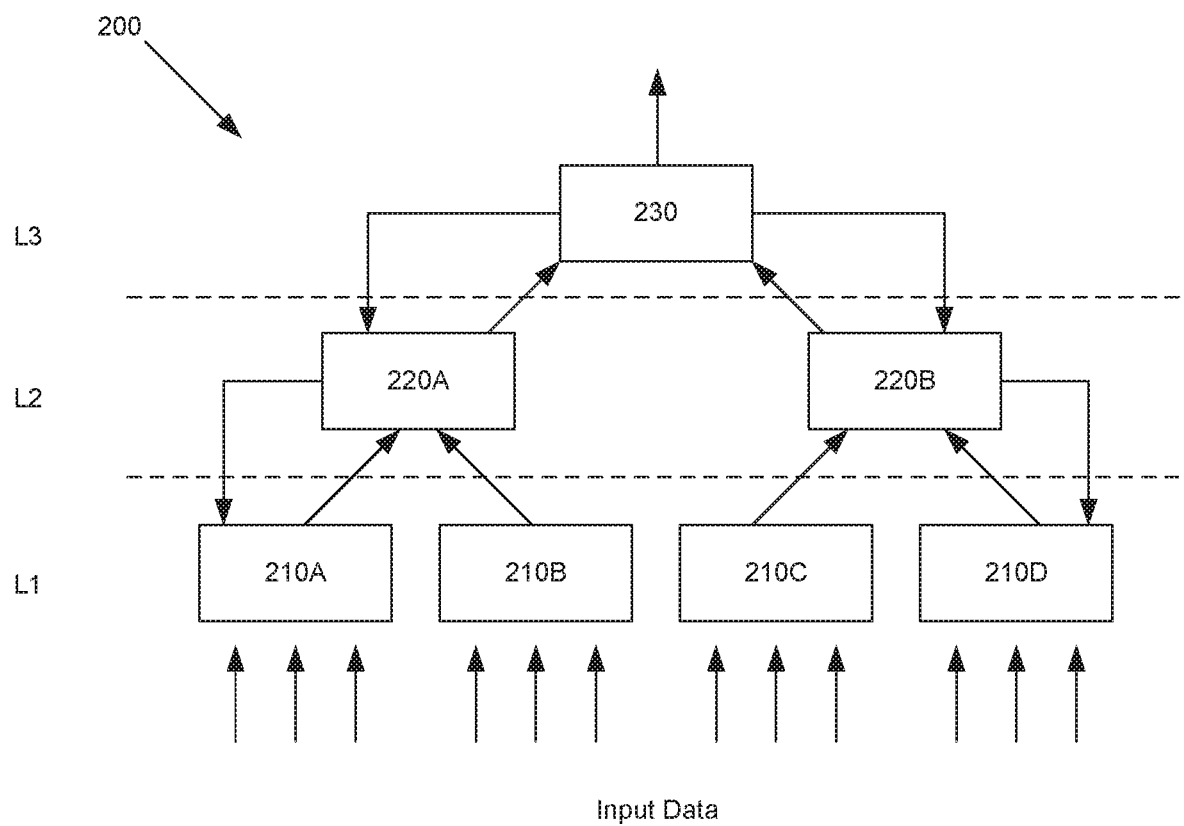
FIG. 2 is a conceptual diagram illustrating an HTM system with multiple processing nodes at lower levels, according to one embodiment.

The number of levels and arrangement of processing modes in FIGS. 1 and 2 are merely illustrative. Many variants of an HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external super-vision signal may also be fed to each of the processing nodes to enhance spatial and/or temporal processing performance.

In one embodiment, one or more nodes of the temporal memory system receives sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory counts, energy or power usage data, data representing genes, results of scientific experiments or parameters associated with operation of a machine (e.g., vehicle operation), or medical treatment data. The temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identification of a person appearing in the image, interpretation of meaning using natural language processing, prediction of a weather forecast, identification of patterns in a person's behavior, generation of control signals for machines (e.g., automatic vehicle navigation), determination of gene expression and protein interactions, determination of analytic information describing access to resources on a network, determination of parameters for optimizing a manufacturing process, prediction of inventory, prediction of energy usage in a building or facility, predictions of links or advertisement that users are likely to click, identification of anomalous patterns in insurance records, prediction of experiment results, indication of illness that a person is likely to experience, selection of contents that may be of interest to a user, prediction of a person's behavior (e.g., ticket purchase, no-show behavior), prediction of election results, prediction or detection of adverse events, identification of a string of text in an image, identification of a topic in text, and a prediction of a patient's reaction to medical treatments. The underlying representation (e.g., image, audio, video, text) can be stored in a non-transitory, computer-readable storage medium.

Structure of Example Processing Node and Overall Process

Figure 3:
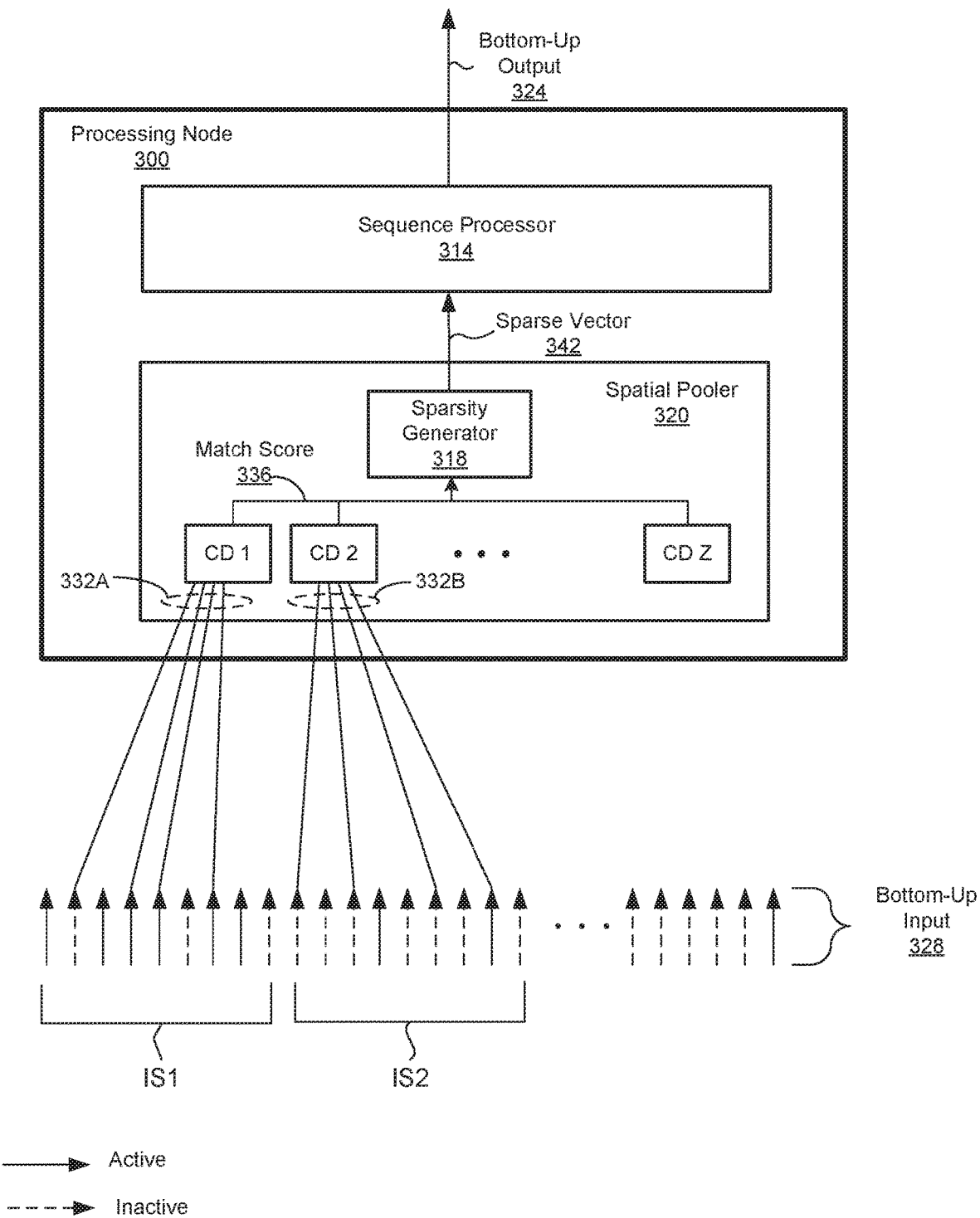
FIG. 3 is a block diagram illustrating a processing node of an HTM system, according to one embodiment.

FIG. 3 is a block diagram illustrating processing node 300 in a temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1A through 2. Particularly, the processing node 300 may be the lowest node 240A receiving sensor data and action data as its input, whereas upper processing nodes are embodied using a different structure as described below in detail with reference to FIG. 10.

Processing node 300 may include, among other components, a sequence processor 314 and a spatial pooler 320. Spatial pooler 320 receives bottom-up input 328, performs spatial pooling, and sends sparse vector 342 in a sparse distributed representation to sequence processor 314. The sparse vector 342 includes information about patterns detected in the bottom-up input 328. For a processing node 300 at the lowest level, the bottom-up input 328 may be sensed input. For processing nodes at intermediate and top levels, the bottom-up input 328 may be a bottom-up output from a child node or children nodes. The spatial pooling is described below in detail with reference to FIG. 5. The processing nodes at different hierarchical levels may have a different structure, for example, as described below in detail with reference to FIG. 10.

Sequence processor 314 receives the sparse vector 342, performs temporal processing and generates the bottom-up output 324. The bottom-up output 324 represents information describing temporal sequences detected or predicted in the spatial patterns of the bottom-up input 328. Bottom-up output 324 is fed to a parent node, which may have a similar or the same structure as processing node 300.

Figure 4:
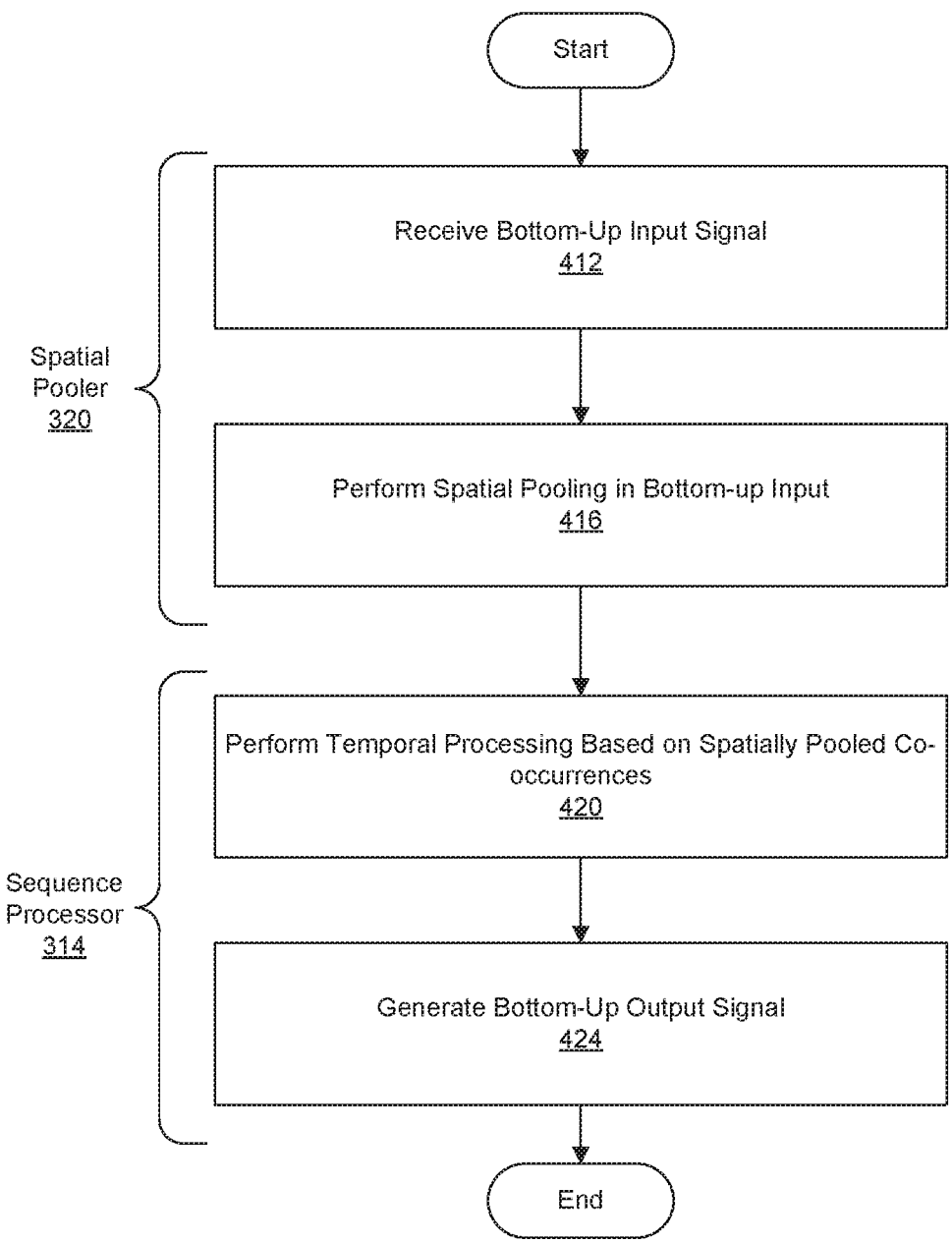
FIG. 4 is a flowchart illustrating an overall process in a processing node of an HTM system, according to one embodiment.

FIG. 4 is a flowchart illustrating an overall process at processing node 300, according to one embodiment. Spatial pooler 320 receives 412 bottom-up input 328. Then spatial pooler 320 performs 416 spatial pooling for co-occurrences detected in bottom-up input 328, as described below in detail with reference to FIG. 5A. As a result, spatial pooler 342 generates sparse vector 342 that is sent to sequence processor 314.

Sequence processor 314 receives sparse vector 342 and performs 420 temporal processing based on spatially pooled co-occurrences, as described below in detail with reference to FIG. 10. Sequence processor 314 then generates 424 bottom-up output 324 that is sent to a parent node.

The process described in FIG. 4 is merely illustrative. Various additional steps may be added, and certain steps may be omitted from the step depending on the structure and function of the processing nodes.

Spatial Pooling Using Local Inhibition

Spatial pooler 320 performs spatial pooling by producing the sparse vector 342 in the form of a sparse distributed representation. In a sparse distributed representation, a number of elements in the sparse vector 342 are inactive (e.g., assigned a value of zero) while the remaining elements are active (e.g., assigned a value of one). For example, sparse vector 342 may have approximately 10% of its elements active while approximately 90% of its elements are inactive. The percentage of active elements may be fixed (i.e., a fixed-sparsity representation) or the percentage of active elements may change over time.

Spatial pooling is the process of grouping similar spatial patterns and representing these spatial patterns using a single vector. Taking an example of processing input data for 100×100 input space (i.e., 10,000 elements), the total number of unique spatial patterns is $2^{10,000}$, assuming that each element of the input data is binary (i.e., zero or one).

Referring to FIG. 3, spatial pooler 320 includes, among other components, a sparsity generator 318 and a plurality of co-occurrence detectors (CDs) 1 through Z. CDs detect co-occurrences in bottom-up input 328, and generate match scores 336. Match scores 336 indicate the degree of match between a spatial pattern of the bottom-up input 328 and a co-occurrence pattern associated with each CD. In one embodiment, a higher match score indicates more overlap between bottom-up input 328 and the associated co-occurrence pattern of each CD. The match scores 336 are provided to the sparsity generator 318. In response, the sparsity generator 318 generates sparse vector 342 in the form of a sparse distributed representation.

In one embodiment, each CD is mapped to a subset of elements in the bottom-up input 328 within predefined input space. As illustrated in FIG. 3 by lines extending from CD 1 to a subset of arrows of bottom-up input 328, CD 1 is mapped to receive a subset 332A of elements of the bottom-up input 328 within input space IS1. Similarly, CD 2 is mapped to receive a subset of elements of the bottom-up input 328 within input space IS2. Although illustrated in FIG. 3 as one-dimensional for the sake of simplification, the input space (e.g., IS1, IS2) may consist of two or more dimensions.

The input space of each CD may be mutually exclusive or may partially overlap. Also, each CD may be mapped to receive the same number of input elements or a different number of input elements. Each input element could be binary or contain scalar values. In one embodiment, CDs are arranged to have topological relationships to their input space. For example, adjacent CDs cover adjacent portions of input space.

The sparsity generator 318 collects the match scores 336 from the CDs, selects a number of CDs satisfying conditions based on their match scores and match scores of nearby CDs to generate sparse vector 342. In one embodiment, when a CD becomes dominant (e.g., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node 300.

In one embodiment, the inhibition range of processing nodes increases at a higher level of the HTM system compared to the inhibition range of processing nodes at a lower level of the HTM system. The inhibition ranges of the processing nodes may be set so that the densities of the sparse vectors in the processing nodes at different levels are the same or within a predetermined range. The processing nodes at a higher level cover a larger range of input space than the processing nodes at a lower level. Hence, in order to achieve the same level of density across different levels of processing nodes, the inhibition range for processing nodes may be increased as the level in the hierarchy increases.

In one embodiment, a greedy winner selection algorithm is used to select the dominant CD.

In an example of sparse vector 342, elements corresponding to the chosen CDs are indicated as being active, and elements corresponding to unselected CDs are indicated as being inactive. Assume that the spatial pooler includes 10 CDs of which the first CD and the fourth CD were selected for high match scores. In this example, the sparse vector may be (1, 0, 0, 1, 0, 0, 0, 0, 0, 0), where the first and fourth elements are active but other elements are inactive. The density of the spatial vector representing the ratio of selected CDs among all CDs is governed by the inhibition range and the selection threshold value (the density of sparse vector 342 increases as the as the percentage of selected CDs increases). As the inhibitory range of a dominant CD increases, the density of the sparse vector 342 decreases. Further, as the selection threshold value increases, the density of the sparse vector increases. Conversely, as the inhibitory range of a dominant CD decreases, the density of the sparse vector 342 increases. Also, as the selection threshold value decreases, the density of the sparse vector 342 decreases. The combination of inhibitory range and the selection threshold value maintains the density of sparse vector 342 within a certain range. Alternatively, a fixed number of CDs may be selected from all CDs based on the match scores (e.g., a certain number of CDs with highest match scores).

When a new spatial pattern is presented, the match scores from the CDs may be updated accordingly. The updated match scores may prompt changes in sparse vector 342. In one embodiment, sparsity generator 318 implements hysteresis by retaining a previously chosen CD in the top CDs until a competing CD has a match score exceeding the match score of the chosen CD by a threshold score (e.g., a match score 20% higher). In this way, the sparse vector becomes more stable over time and more robust to noise.

Figure 5:
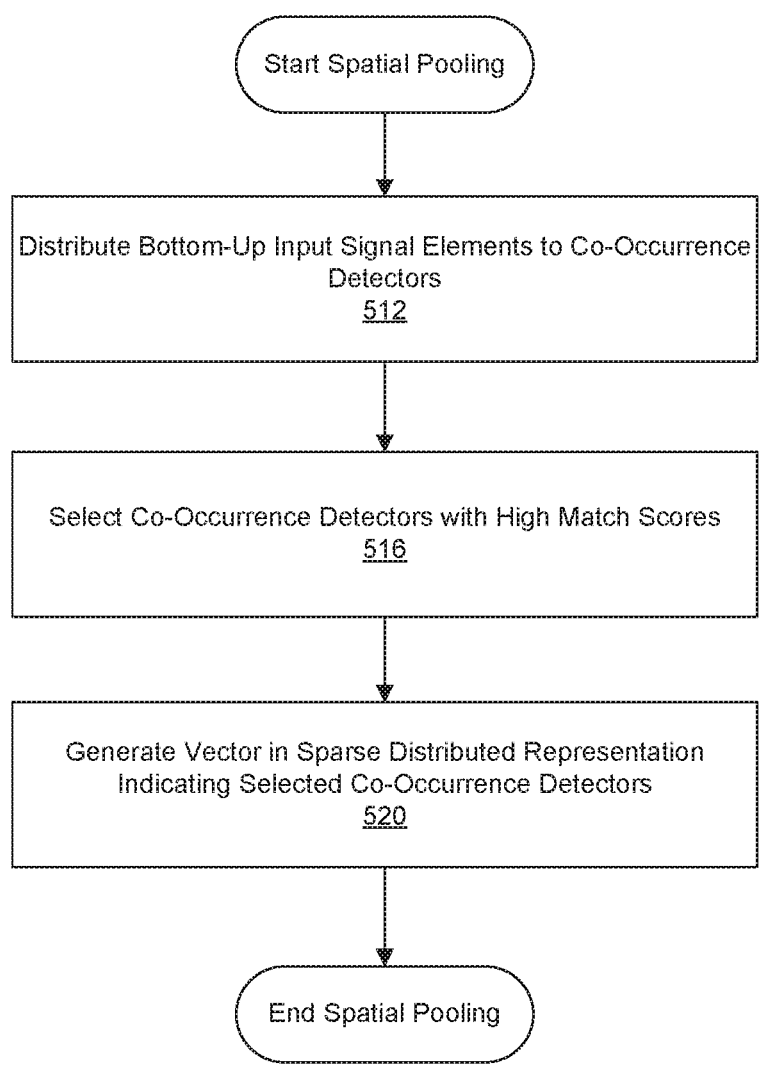
FIG. 5 is a flowchart illustrating a method of performing spatial pooling in a processing node, according to one embodiment.

FIG. 5 is a flowchart illustrating a method of performing spatial pooling in processing node 300, according to one embodiment. First, the elements of bottom-up input 328 are sent 512 to CDs according to the mappings between the input elements of the bottom-up input 328 and CDs.

Each CD then generates a match score indicating the extent to which a co-occurrence pattern associated with the CD matches the received input elements. Based on the match scores 336 from CDs, sparsity generator 318 selects 516 CDs that have high match scores 336. In selecting the CDs, local inhibition may be employed to partially or entirely exclude CDs within an inhibition range of a dominant CD. As a result of the selection, a subset of CDs is selected from the entire CDs (e.g., 50 CDs are selected from a total of 500 CDs). Sparsity generator 318 then generates 520 sparse vector 342 in the form of a sparse distributed representation to indicate the selected CDs.

Since each sparse vector may represent one or more spatial patterns, the spatial pooling achieves abstraction and generalization in spatial domain. A sparse vector 342 that changes over time is then provided to sequence processor 314 to perform abstraction and generalization in the temporal domain.

Temporal Processing in Sequence Processor

Temporal processing includes various time-based processing of spatial patterns such as recognizing, predicting, or labeling of temporal sequences. Sequence processor 314 learns and stores transitions between spatial patterns as represented by sparse vector 342. Based on the learned transitions, sequence processor 314 recognizes and predicts the same or similar transitions in a new input signal. Embodiments provide a temporal processing mechanism that takes advantage of the characteristics of sparse distributed representation vectors to learn, recognize, and predict temporal sequences of spatial patterns or parts of spatial patterns.

Sequence processor 314 may learn, store and detect temporal sequences of different lengths (also referred to as "variable order" temporal processing). The variable order temporal processing enables learning and detection of more temporal sequences and enhances prediction, inference, or other capabilities of the processing node.

Sequence processor 314 may also learn, store, and detect temporal sequences while performing inference, prediction or other temporal processing (also referred to as "online learning"). The online learning combines a learning (or training) phase and a temporal processing (e.g., predicting) phase into a single phase. By combining two distinct phases into a single phase, sequence processor 314 can process information in a more time-efficient manner.

In one embodiment, the sequence processor 314 receives a sparse vector 342 that remain constant until a next discrete time steps. A time step herein refers to a division of time for performing digital processing at the processing node 300. During each time step, the sparse vector 342 is assumed to maintain a particular set of values. For instance, the sparsity generator 318 periodically samples the match score 336 to output a sparse vector 342 that may be updated after each time step. Alternatively or additionally, the bottom-up input 328 is converted into discrete values at discrete time steps, and the processing node 300 determines values at discrete time steps. Accordingly, the sequence processor 314 may learn, store, and detect temporal sequences of values that are updated over discrete time steps. Using discrete time steps is advantageous, among other reasons, because computational complexity is reduced.

Figure 6:
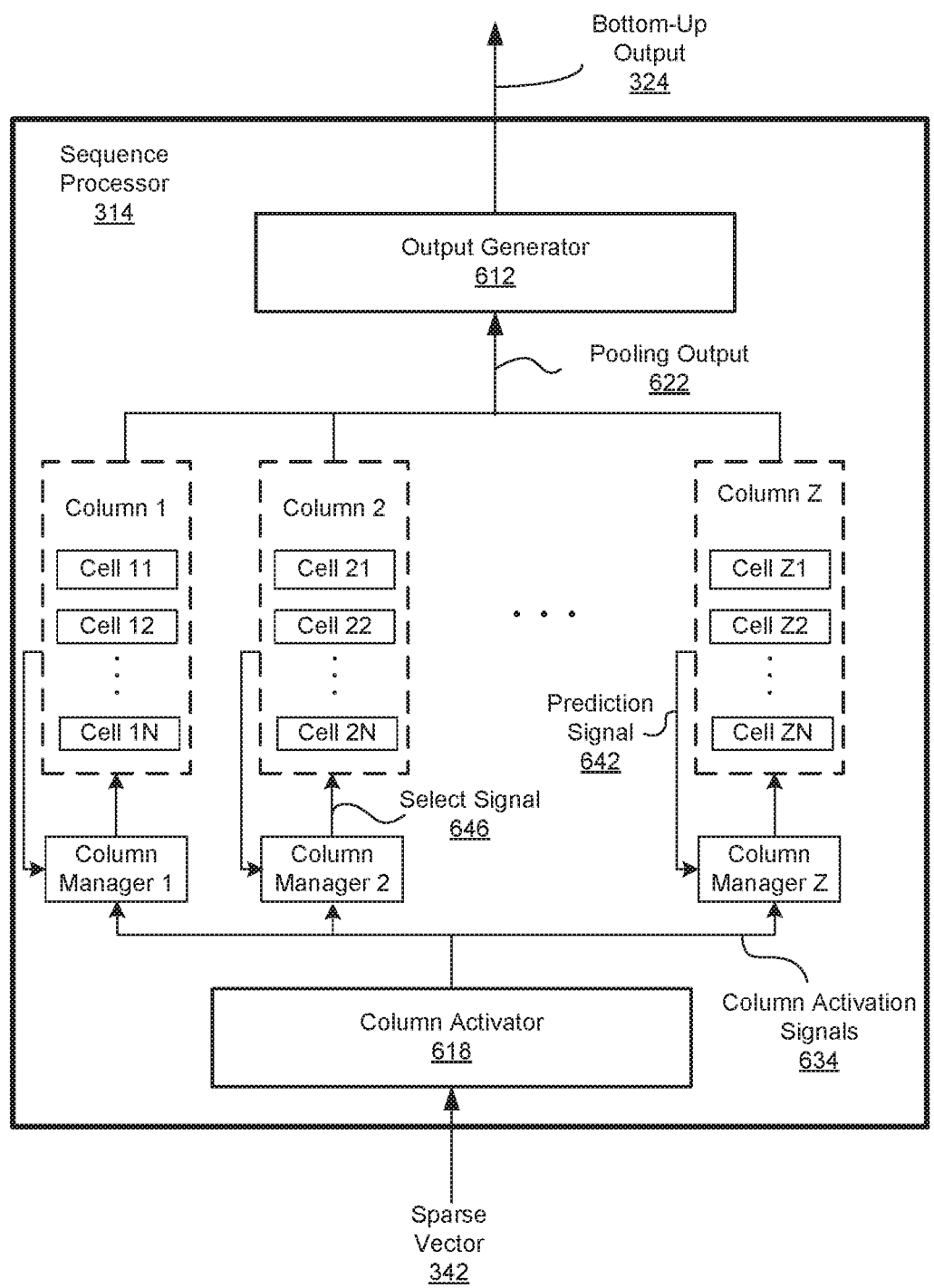
FIG. 6 is a block diagram illustrating a sequence processor in a processing node, according to one embodiment.

FIG. 6 is a block diagram illustrating sequence processor 314, according to one embodiment. Sequence processor 314 may include, among other components, output generator 612, columns of cells (in dashed boxes), column managers, and column activator 618. The column activator 618 receives sparse vector 342 from spatial pooler 320. In response, column activator 618 generates column activation signals 634 indicating which columns to be activated based on sparse vector 342.

The number of total columns may coincide with the total number of elements in sparse vector 342. The column activator 618 receives sparse vector 342 and determines which elements of sparse vector 342 are active. Then, column activator 618 sends column activation signals 634 to corresponding columns to activate these columns.

In one embodiment, each column includes the same number (N) of cells. A cell has three states: inactive, predictive, and active. A cell becomes activated (i.e., in an active state) in response to activation by the select signal 646. When a cell in a column becomes activated, the active cell inhibits activation of other cells in the same column except in certain limited circumstances. The predictive state represents a prediction that the cell will be activated by the select signal 646 at a next time step. A cell becomes predictive (i.e., in a predictive state) in response to current sequence outputs from other cells in the same processing node 300 or level. Alternatively or additionally, the cell becomes predictive due to any combination of inputs from other nodes, inputs from action information, and to sparse vector 342. For example, an input from a higher-level node represents context used to predict cell activation corresponding to behavior generated in response to the context. As another example, an input from a lower-level node represents a change in orientation or position of a sensor used to predict cell activation corresponding to recognition of a pattern from the sensor input. In some embodiments, a cell may simultaneously be activated and predictive. In some embodiments, a cell is either activated or predictive, and a cell having inputs meeting conditions to make the cell both active and predictive becomes active. A cell that is in neither an active state nor a predictive state is referred to as inactive (i.e., in an inactive state).

Each column is connected to an associated column manager. The column manager receives the column activation signal 634, determines activation states of cells in the column (based on prediction signal 642), and sends select signal 646 to activate one or more cells in the column under certain circumstances. The prediction signal 642 identifies which cells in the column are in a predictive state. In one embodiment, the column manager sends the select signal 646 to one or more cells in the column to activate those cells in response to the column activation signal 634.

In one embodiment, the column manager selects the cells to activate according to the prediction signal 642. For example, the column manager selects one or more of the cells in the column that are currently in a predictive state (as indicated by the prediction signal 642). Continuing the example, if the prediction signal 642 indicates that no cell in the column is currently in a predictive state, the column manager selects one or more of the cells (e.g., all of the cells in the column) to activate. When no cell in the column is currently in a predictive state, the column manager may select a cell in the column for activation based on how recently the cell was activated. Specifically, the cell most recently activated in the column may be selected for activation. If no prior activated cell exists, then the best matching cell or the least used cell may be chosen for activation.

In another embodiment, the column manager selects one or more cells in the column even though the prediction signal 642 indicates that other cells are in the predictive state. For example, the column manager may select the cell to learn the connections randomly or according to a predetermined list. The column manager sends the select signal 646 to activate the selected cells. The selected cells then learn a temporal sequence by making connections to active cells in other columns, as described below in detail with reference to FIGS. 7 and 8. The selected cells may also make connections to any combinations of active cells in other processing nodes (including processing nodes both in the same layer as the processing node 300 and in different layers from processing node 300), inputs from different levels and action information.

The cells individually, or collectively as a column, send pooling output 622 to output generator 612. The pooling output 622 identifies the state of the cells. For instance, the pooling output 622 indicates which cells are activated and/or which cells are predictive. In certain applications (e.g., flash inference), a column generates a pooling output 622 to indicate whether any of the cells in the column are activated. In such application, once any cell in the column is activated, the column sends a pooling output 622 indicating that the column is active. The pooling output may be represented as a binary value such as a two-bit binary value, with one bit indicating whether the cell is activated and one bit indicating whether the cell is predictive. Although the pooling output 622 takes a binary value in most cases, the pooling output 622 may also be a non-binary value. For example, the pooling output 622 may include an integer or real-number value indicating the strength of the cell's cell activated state or predictive state.

In one embodiment, output generator 612 collects the pooling outputs 622 from the cells or columns and concatenates these outputs into a vector. The concatenated vector may be sent as bottom-up output 324 of the sequence processor 314 to a parent processing node for further temporal processing and/or spatial pooling. Alternatively, the concatenated vector may be provided as an output of the temporal memory system or be further processed to identify a higher level cause of the input signal. The output generator 612 may also function as a buffer and synchronize signals from sibling processing nodes.

The bottom-up output 324 is also a vector in a sparse distributed representation. The percentage of active (or inactive) elements in the bottom-up output 324 may be any percentage, but the percentage is often less than approximately 10%.

In one embodiment, the output generator 612 collects the pooling outputs 622 and outputs an active cell (AC) vector (identifying activated cells) and a predicted active cell (PAC) vector identifying activated cells that were correctly predicted to become active. The output generator 612 identifies the predicted active cells by comparing a list of currently activated cells to a list of cells in the predictive state at a last time step before the current time step. The predicted cell vector includes those cells in common between the list of currently activated cells and the list of cells in the predictive state at the last time step. Because the predicted active cells are a subset of the activated cells (or include all the activated cells), the number of active elements in the first vector equals or exceeds the number of elements in the second vector.

Example Operation and Function of Cell in Sequence Processor

Sequence processor 314 performs temporal processing by selectively activating cells (and columns), and learning previous states of cell activations. As the learning at the cells progresses, the cells learn to anticipate spatial patterns in the bottom-up input 328 and correspondingly enter a predictive state before corresponding spatial patterns appear in bottom-up input 328, causing those cells to then transition to an activated state. When a cell transitions from a predictive state to an active state, the cell may remain in the active state for a time after the transition. As cells remains active for a longer time, the cells produce a more stable and invariant bottom-up output 314 to a parent node.

Figure 7:
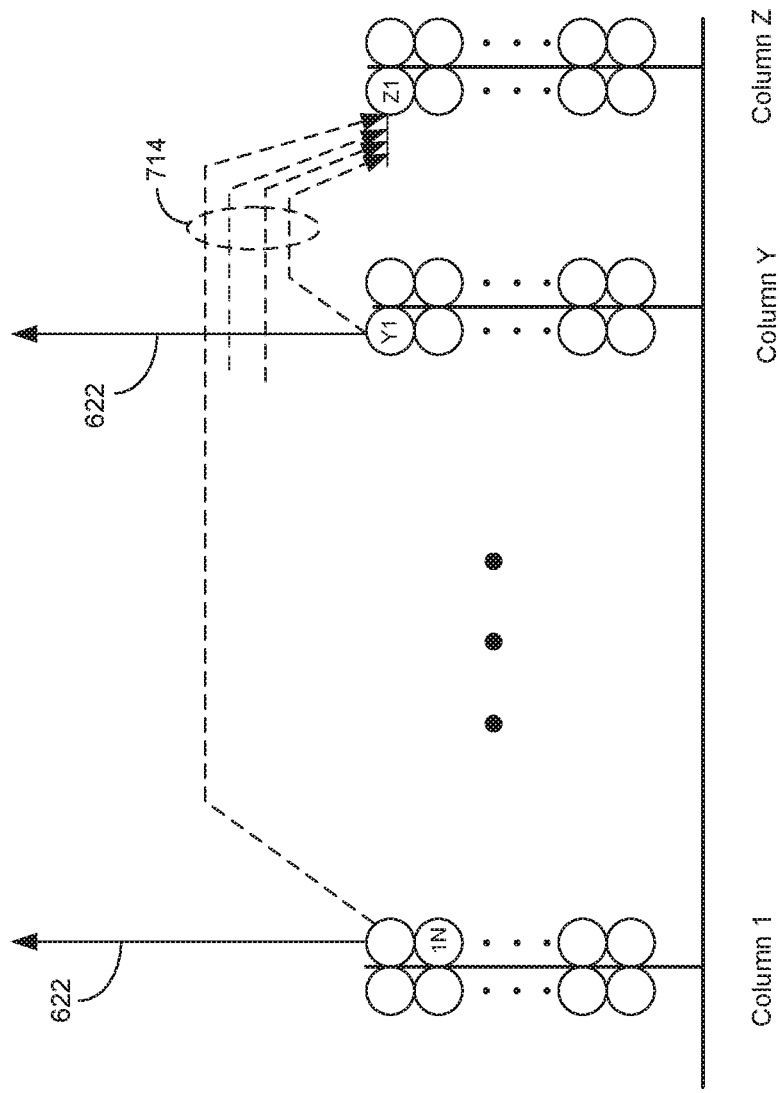
FIG. 7 is a conceptual diagram illustrating operation of columns of cells, according to one embodiment.

FIG. 7 is a diagram illustrating columns and output signals from the cells, according to one embodiment. Each circle in FIG. 7 represents a cell. When each cell becomes active, the cell sends out pooling output 622. An activated cell may also send out a sequence output 714 to other cells to indicate its activation state. A basic idea behind implementing temporal processing is to have a learning cell, upon activation, detect activation states of other cells and store the activation states in a "temporal memory segment." The stored activation states may be current activation states and/or previous activation states of other cells. A "temporal memory segment" herein refers to a data structure for storing the activation states of other cells.

In storing the activation states, the cell selects a subset of active cells and stores only the states of the selected cells. A large number of cells in a processing node 300 may be active at the same time. Therefore, a large memory space may be needed to store activation states of all activated cells in the processing node. To reduce the memory requirement, a small number of active cells may be sub-sampled and states of the sub-sampled cells may be stored in the temporal memory segments of the cell. For example, when cell Z1 is first activated, cell Z1 could receive activation states of all active cells (e.g., 50 cells) at this time step but stores information for only a select number of cells (e.g., 10 cells). The sub-sampling of cells may also contribute to generalization of spatial patterns and/or temporal sequences.

In one embodiment, each temporal memory segment stores the activation states of the same number of cells. In another embodiment, each temporal memory segment stores the activation states of a different number of cells.

When a cell detects activation of all or over a percentage of cells stored in its temporal memory segments, the cell enters into a predictive state and produces a pooling output 622 indicating its predictive state. This transition is predictive in nature because the transition to the predictive state is based on activation of other connected cells and not based on receiving a column activation signal (via select signal 646) to activate the cell.

For example, a cell may become predictive when more than 90% of cells identified in a temporal memory segment are active. Under certain conditions, the cell may also produce sequence output 714 sent to other cells to indicate its activation state. In one embodiment, a cell becomes predictive when a fixed number of cells or more than a threshold percentage of cells stored in one of its temporal memory segments become active. In other embodiments, the cells become predictive when the activation states of other cells partially or entirely match a list of stored activation states.

Figure 8:
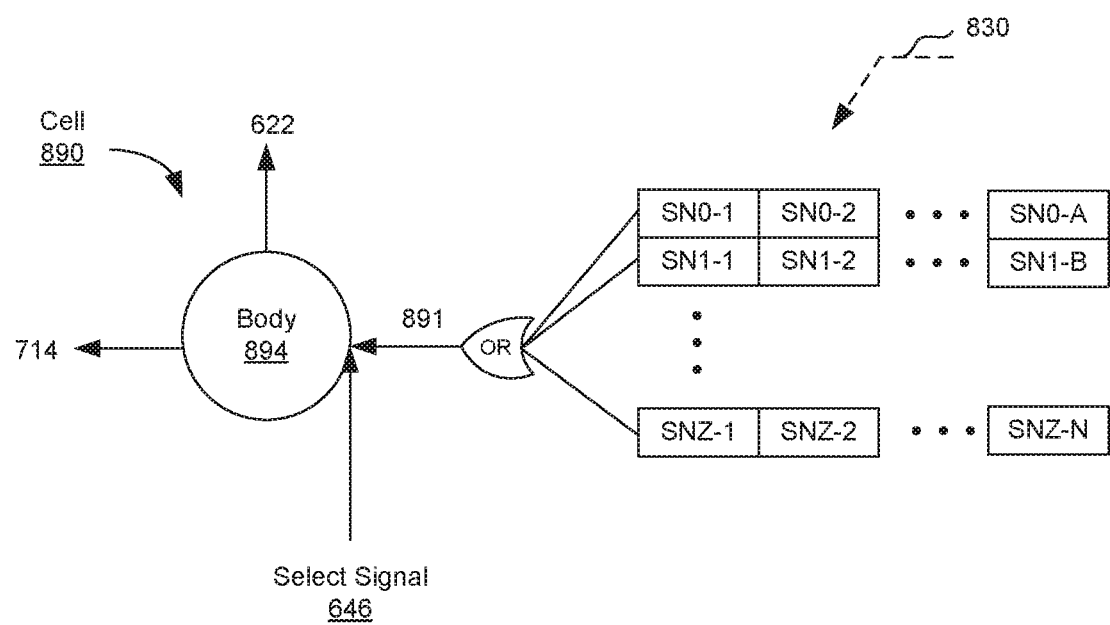
FIG. 8 is a conceptual diagram illustrating the operation of a cell, according to one embodiment.

FIG. 8 is a conceptual diagram illustrating signals associated with a cell 890, according to one embodiment. Cell 890 includes a body 894 and a dendrite 891. The dendrite 891 of cell 890 receives sequence inputs 830 and the body 894 of cell 890 receives select signal 646. Sequence inputs 830 are collective sequence outputs 714 sent out by other cells having connections with cell 890. Cell 890 establishes connections with the other cells during learning to monitor their activation states. Cell 890 also receives select signal 646. In one embodiment, the select signal 646 becomes active when: (i) cell 890 is in a predictive state, then transitions to an active state in response to the column activation signal 634, and/or (ii) cell 890 is not in a predictive state but is nonetheless selected for activation in response to the column activation signal 634. For example, the column containing cell 890 receives a column activation signal 634 but no cells in the column are in a predictive state, so the column manager selects cell 890 as a candidate cell for learning. In this example, cell 890 may be selected as a candidate cell according to a ranking of cells in the column by likelihood of entering the predictive state.

Activation states of other connective cells associated with the cell 890 transitioning to the predictive state may be stored in temporal memory segments SN0-through SNZ-N Cell 890 generates pooling output 622 and sequence output 714 based on select signal 646 and sequence inputs 830. Pooling output 622 is generated whenever cell 890 becomes active or predictive. Sequence output 714 is generated when certain conditions are met, as described below in detail with reference to FIG. 9.

Figure 9:
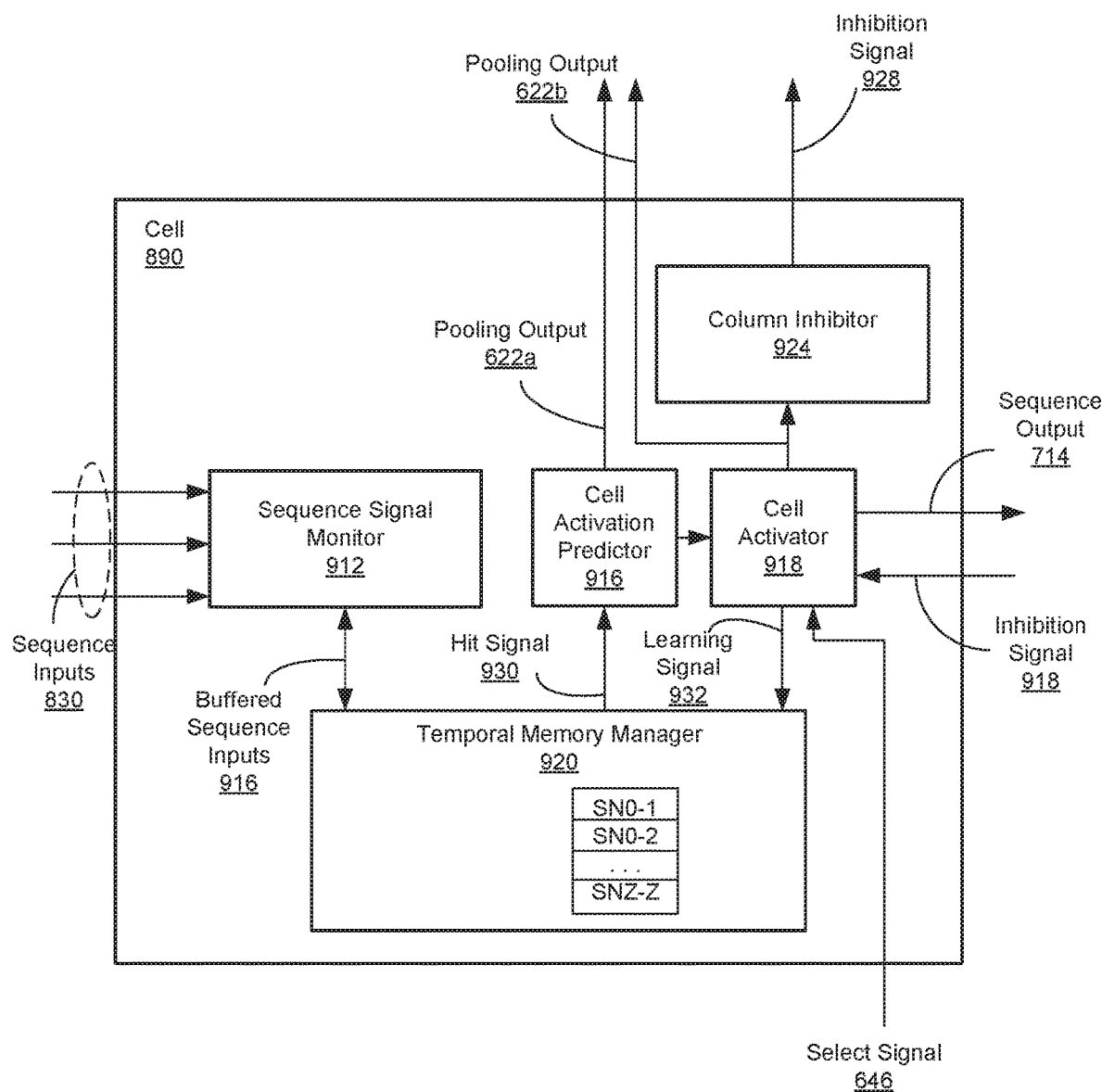
FIG. 9 is a block diagram illustrating a cell, according to one embodiment.

FIG. 9 is a functional block diagram illustrating cell 890, according to one embodiment. Cell 890 may include, among other components, a sequence signal monitor 912, a cell activation predictor 916, a cell activator 918, a temporal memory manager (TMM) 920, and a column inhibitor 924. The sequence signal monitor 912 is software, firmware, hardware or a combination thereof for receiving sequence inputs 830 from other cells in the same processing node or level. The sequence signal monitor 912 buffers sequence inputs 912. The stored sequence inputs 912 are referenced by TMM 920 for processing.

TMM 920 is software, firmware, hardware, or a combination thereof for managing temporal memory segments. TMM 920 performs various operations associated with writing, updating, retrieving, and comparing cell activation states. As described above in detail with reference to FIG. 8, cell activation states stored in different temporal memory segments of TMM 920 represent activation states of other cells at different times. When learning is activated, TMM 920 detects current and/or previous states of cell activations based on the sequence inputs 830 and stores the detected cell activation states in temporal memory segments. TMM 920 also compares the sequence inputs 830 to cell activation states stored in temporal memory segments. If the sequence inputs 830 indicate that (i) all elements of a temporal memory segment are active or (ii) a number or percentage of elements of a temporal memory segment above a threshold is active, TMM 920 sends hit signal 930 to cell activation predictor 916. The hit signal 930 indicates that the cell is in a predictive state due to activation of cells whose activation corresponded to subsequent activation of the cell 890. The temporal memory manager 920 may activate learning in response to (i) sending the hit signal 930 indicating that the cell is in a predictive state, or (ii) receiving learning signal 932 indicating that the cell in in an active state.

Cell activation predictor 916 receives hit signal 930 from TMM 920 and generates pooling output 622a indicating that the cell 890 is in a predictive state. The cell activation predictor 916 may send indications of the cell's previous predictive states to the cell activator 918. For example, the cell activation predictor 916 indicates to the cell activator 918 whether the cell 890 was in a predictive state during a last time step.

The cell activator 918 receives the select signal 646 and the inhibition signal 918 and places the cell 890 in an activated state when certain conditions are met. If the cell 890 is placed in an activated state, the cell activator 918 generates pooling output 622b, sequence output 714, and learning signal 932.

One condition for cell activation is that there be no inhibition signals 918 from other cells in the same column or in a different column. If inhibition signal 918 is received from other cells, cell 890 is not activated despite select signal 646. In one embodiment, pooling output 622b is generated regardless of the reasons cell 890 is activated whereas sequence output 714 is generated under certain conditions. Specifically, the sequence output 714 is generated (i) when the activation of cell 890 was predicted based activation states of other cells and (ii) the prediction of the cell 890 turned out to be correct. By generating sequence output 714 only when the prediction of the cell 890 was correct, other cells connected to cell 890 learn temporal sequences that are productive to correct prediction while discarding meaningless or noisy temporal sequences that do not contribute to prediction. Alternatively, the sequence output 714 is generated even when the activation of the cell 890 was inaccurately predicted. The sequence output 714 and/or the pooling output 622b indicate that the cell 890 is activated for a longer time to enable more connected cells to learn the activation state of the cell 890 while the sequence output 714 is activated for a short time when the activation of the cell 890 was inaccurately predicted.

In response to activation of the cell 890 by the cell activator 918, column inhibitor 924 generates inhibition signal 928. Inhibition signals are sent to other cells in the same column or in a different column to inhibit activation of the other cells. The cells communicating the inhibition signals may be within a predefined inhibition range, as described above in detail with reference to FIG. 3.

In one embodiment, TMM 920 uses a dynamic threshold for generating hit signal 930. Specifically, TMM 920 dynamically adjusts the number or percentage of elements of sequence inputs 830 that should match the elements stored in a temporal memory segment or an activation window before hit signal 930 can be generated.

The cell 890 transitioning to a predictive state represents a prediction based on activation of other cells in sequence processor 314. By lowering the number of percentage of coinciding elements to generate hit signal 930, the cell 890 may be activated more frequently. More frequent transitions of the cell 890 to the predictive state indicate making more liberal predictions for when the cell will be activated. Lowering the requirement for coinciding elements has a similar effect of forcing the cells or the temporal memory system to make predictions that would otherwise not be made. To the contrary, raising the requirement for coinciding elements has a similar effect of restricting the cells or the temporal memory system to making only conservative and limited predictions.

The threshold for generating the hit signal 930 may be adjusted by detecting activation states of cells corresponding to a certain segment of input space. If the level of cell activation for such a segment drops below a level, the dynamic threshold of cells for the segment of input space is lowered to prompt more transitions to the predictive state by cells. Conversely, if the level of cell activation of a segment of input space it above a level, the dynamic threshold may be increased to reduce transitions to the predictive state by cells.

In one embodiment, TMM 920 compares the activation and predictive states of cell 890 to the column activation signal 634 to determine if the cell activation states stored in a temporal memory segment resulted in improper transitions by cell 890 to the predictive state.

For each temporal memory segment or set of cell activation prediction states, TMM 920 tallies a productivity score that is increased or decreased depending on whether column activation signal 634 activating the column followed early transitions by cell 890 to the predictive state. If cell activation states stored in a temporal memory segment resulted in the cell 890 becoming predictive but the transition was not followed by column activation signal 634 activating the column, the productivity score for the cell activation states or temporal memory segment is reduced. Conversely, the productivity score is increased if the stored cell activation states or temporal memory segment contributed to correct activation of cell 890. If the productivity score drops below a threshold, the cell activation states are deleted or the temporal memory segment is initialized to "forget" the learned connections.

Example Temporal Pooling in Union Processor

Figure 10A:
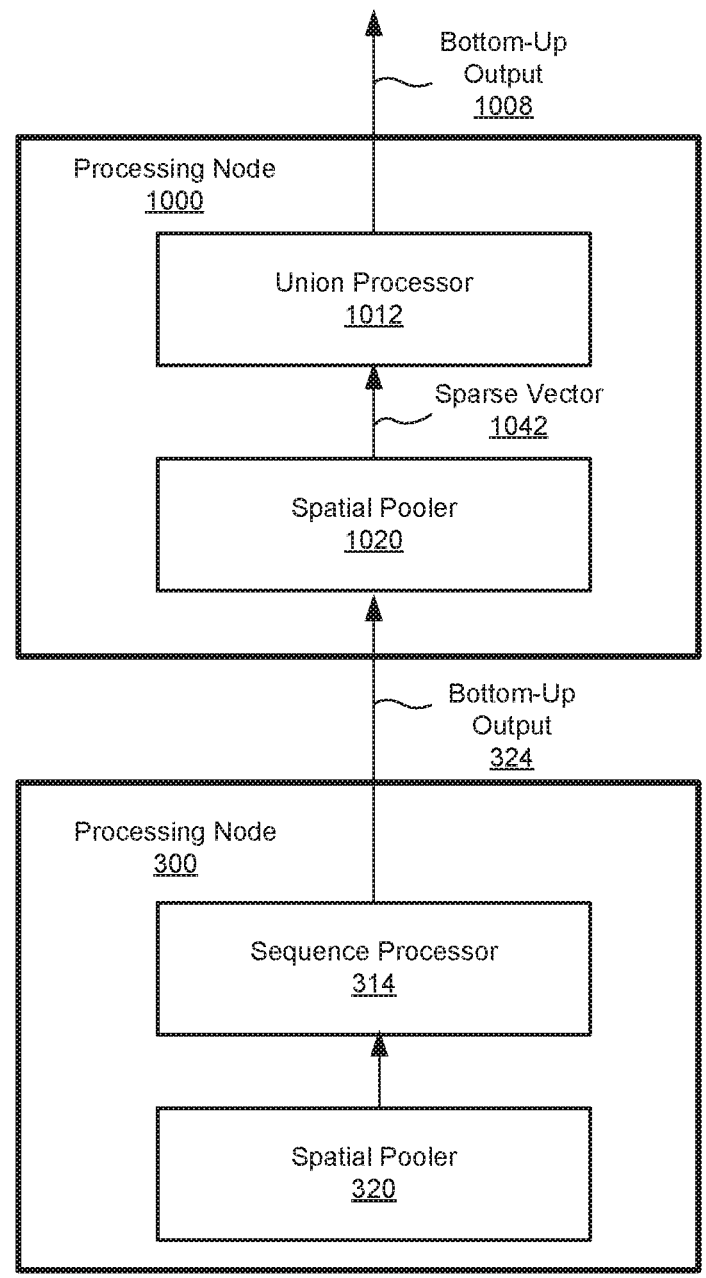
FIG. 10A is a block diagram illustrating a hierarchy of processing nodes including an upper processing node with a union processor, according to one embodiment.

FIG. 10A is a block diagram illustrating a hierarchy of processing nodes, according to one embodiment. The hierarchy of processing nodes includes a lower processing node 300 and an upper processing node 1000. The lower processing node 300 receives input data (not shown), processes the input signal as described above with reference to FIGS. 3 through 9, and outputs bottom-up output 324.

The upper processing node 1000 is coupled to a lower processing node 300 to receive bottom-up output 324. The upper processing node 1000 may include, among other components, a union processor 1012 and a spatial pooler 1020. Unlike the processing node 300 of FIG. 3, the upper processing node 1000 includes the union processor 1012 instead of a sequence processor. The spatial pooler 1020 of the upper processing node 1000 generates sparse vector 1042 based on the bottom-up output 324, as described above in detail with reference to FIG. 3.

Union processor 1012 receives sparse vector 1042 from the optional spatial pooler 1020, performs a predetermined temporal pooling process, and as a result, generates bottom-up output 1008 that represents the activation states of co-occurrence detectors in the spatial pooler 1020 pooled over time, as described below in detail with reference to FIG. 10B. Bottom-up output 1008 may be fed to a parent node, to another processing node, or to any other component (not shown) for further processing.

Figure 10B:
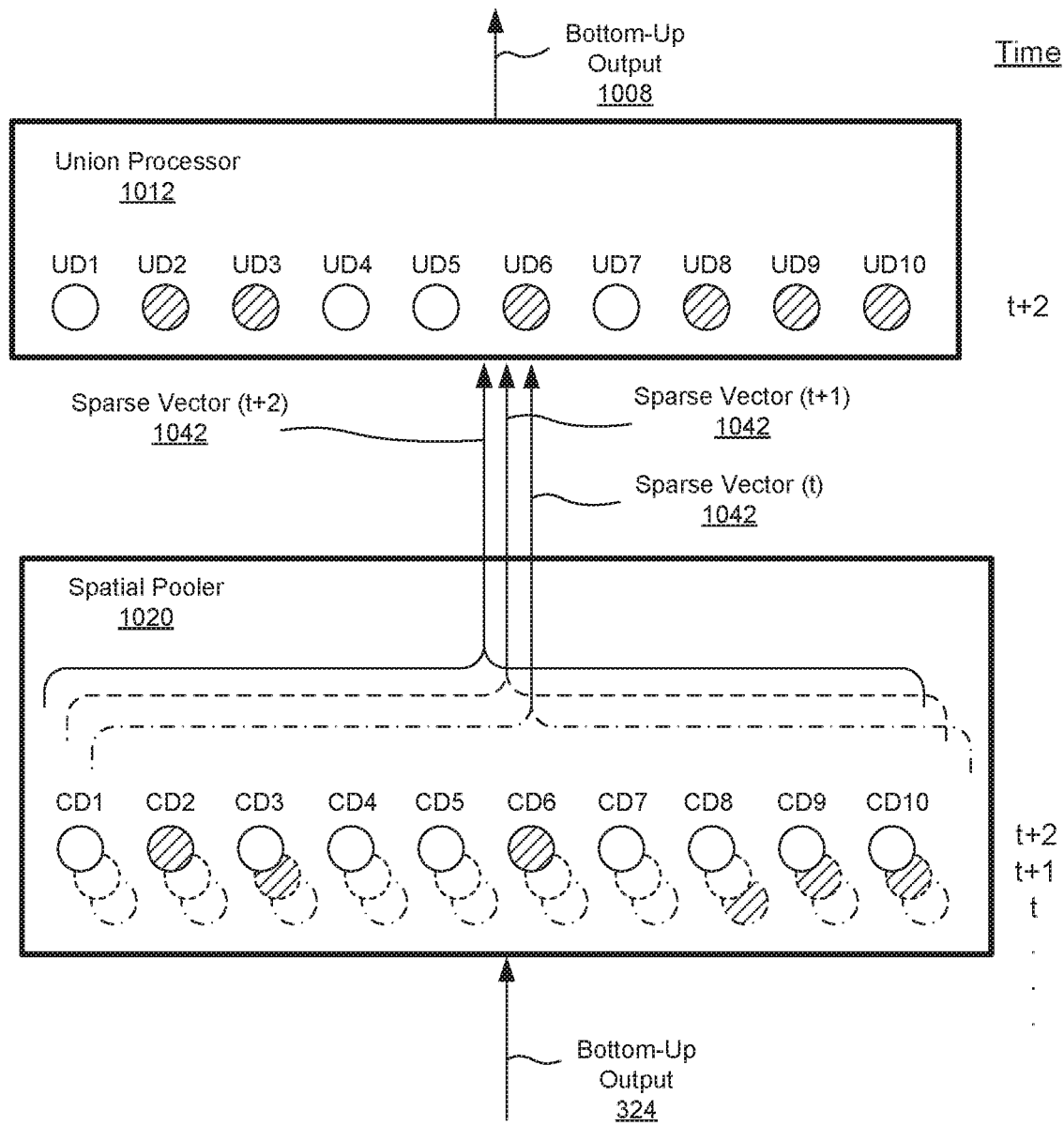
FIG. 10B is a conceptual diagram illustrating the operation of a processing node including the union processor of FIG. 10A, according to one embodiment.

FIG. 10B is a conceptual diagram illustrating the operation of the union processor 1012 in FIG. 10A, according to one embodiment. The union processor 1012 includes a plurality of union elements UD1 through UD10 for performing union processing of sparse vectors 1042 that vary over time. For this purpose, each of the union elements UD1 through UD10 in the union processor 1012 is associated with a subset of elements in the sparse vector 1042. In the embodiment as shown in FIG. 10B, each of the union elements UD1 through UD10 has a one-to-one mapping relationship with the co-occurrence detectors CD1 through CD10 (i.e., union element UD1 is mapped to co-occurrence detector CD1, union element UD2 is mapped to co-occurrence detector CD2, and so forth). However, in other embodiments, the union elements may have one-to-multiple mapping relationship with the co-occurrence detectors (e.g., union element UD1 mapped to co-occurrence detectors CD1 and CD2, union element UD1 mapped to co-occurrence detectors CD3 and CD4, and so forth).

Based on such relationships or mappings, the union processor 1012 performs temporal pooling by rendering the states of union elements UD1 through UD10 to be more stable over time relative to the change in the sparse vector 1042 or the activation states of the co-occurrence detectors CD1 through CD10. One of many ways of performing temporal pooling is by assigning a persistence score to each of the union elements, changing the persistence score based on activation of co-occurrence detectors mapped to the union elements, and activating or deactivating the union elements based on the persistence scores. For example, a persistence score of a union element is changed (e.g., increased) when one or more co-occurrence detectors mapped to the union element is activated. The amount of increase in the persistence score based on the activation of the mapped co-occurrence detector may be determined based on, for example, a sigmoid function. The persistent score is changed (e.g., decreased) over time at a certain rate when the one or more co-occurrence detectors mapped to the union element is deactivated. The amount of decrease in the persistence score is determined based on, for example, a decaying exponential function.

Taking the example of FIG. 10B, the spatial pooler 1020 outputs a series of sparse vectors 1042 to the union processor 1012 from time t to t+2. In this example, the sparse vector 1042 at time t indicates co-occurrence CD8 as being activated, sparse vector 1042 at time t+1 indicates co-occurrences CD3, CD9, and CD10 as being activated, and sparse vector 1042 at time t+2 indicates co-occurrences CD2 and CD6 as being activated. The persistence score of union element UD8 in the union processor 1012 is increased at time t because the sparse vector 1042 at time t indicates co-occurrence CD8 mapped to the union element UD8 as being activated. Similarly, the persistence scores of union elements UD3, UD9, and UD10 are increased at time t+1 because the sparse vector 1042 at time t+1 indicates co-occurrences CD3, CD9 and CD10 as being activated; and the persistence scores of union elements UD2, and UD6 are increased at time t+2 because the sparse vector 1042 at time t+2 indicates co-occurrences CD2, and CD10 as being activated.

In the example of FIG. 10B, the persistence score for a union element is decreased at a time step when the associated element of sparse vector 1042 is inactive (i.e., the associated co-occurrence detector is inactive). For example, in FIG. 10B, the persistence score of union element UD8 in the union processor 1012 is decreased at times t+1 and t+2, since the element of the sparse vector 1042 corresponding to the co-occurrence detector CD8 is no longer active at times t+1 and t+2.

After union elements in the union processor 1012 are activated, the activated union elements remain active beyond the current time step as long as the persistence scores satisfy a predetermined criterion. In one embodiment, a union element may be activated if its persistence score is above a threshold. For example, since the persistence score of the union element UD8 remains above the predetermined threshold at time t+2, the union element UD8 continues to remain active from time t through time t+2 even though its persistence score was decreased at times t+1 and t+2. Similarly, union elements UD2, UD3, UD6, UD8, UD9, and UD10 in the union processor 1012 are collectively in an active state at time t+2 because the persistence scores for each of these union elements are above the predetermined threshold at time t+2.

In one or more embodiments, the union processor 1012 may impose constraints on the sparsity of the activated union elements. In such embodiments, only a proportion of union elements with the highest persistence scores may be activated in the union processor 1012. For example, only 10% of the union elements with the highest persistence scores may be activated in the union processor 1012.

The length of time a union element remains active from the time of its initial activation can be adjusted by controlling the magnitude of increase or decrease in persistence scores or adjusting the threshold. As discussed above, the union processor 1012 increases the persistence score of a union element if it receives input from an activated sparse vector element, but decreases the persistence score of the union element if the associated sparse vector element is inactive. Thus, a union element in the union processor 1012 may be activated for a longer time if the union processor 1012 decreases the persistence scores by smaller amounts, if the union processor 1012 increases the persistence scores by larger amounts, or the threshold for remaining active is lowered.

The unionized representation in the bottom-up output 1008 of the union processor 1012 may be provided to sequence processors or spatial poolers in any processing node including the processing node 1000. For example, the bottom-up output 1008 of the union processor 1012 may be provided to processing nodes at a lower level than the processing node 1000. The union processor 1012 enables a more stable representation of sequence patterns by maintaining the activation states of union elements beyond the current time step. The union processor 1012 unionizes patterns of a temporal sequence and biases the HTM system by providing the bottom-up output 1008 to other processing nodes so that a learned temporal sequence may be more quickly and accurately recognized.

In one embodiment, the union elements of the union processor 1012 may provide their activation states to cells in a sequence processor or sparse vector elements in a spatial pooler in any processing node including processing node 1000. In addition, the union processor 1012 may provide the bottom-up output 1008 to a sequence processor such that the cells in the sequence processor become active or predictive according to the activation states of the union elements in the union processor 1012.

For example, the HTM may receive a sequence of notes corresponding to the beginning of a learned melody. Over time, the union processor 1012 may provide the bottom-up output 1008 to sequence processor 314 in a lower-level processing node 300. Upon receiving the bottom-up output 1008 over time, the cells in the sequence processor 314 related to the learned melody will become predicted or activated at once. Consequently, upon receiving an accidentally incorrect pattern in the sequence (e.g., an incorrect note accidentally inserted in the learned melody), the union processor 1012 biases the HTM to continue predicting subsequent patterns of the recognized sequence (e.g., subsequent notes of the recognized melody). In other words, the union processor 1012 biases the HTM to predict familiar temporal sequences. The union elements of the union processor 1012 maintain a shorter activation time if the HTM receives a temporal sequence that is not learned.

In embodiments where a union element is associated with two or more elements of sparse vector 1042, the persistence score of the union elements may be changed depending on a threshold number or proportion of the mapped co-occurrence detectors. In such embodiments, the persistence score of the union element may be decreased if less than a threshold proportion or number of mapped co-occurrence detectors is active while the persistent score may be increased when more than the threshold portion of the mapped co-occurrence detectors is inactive.

Figure 11A:
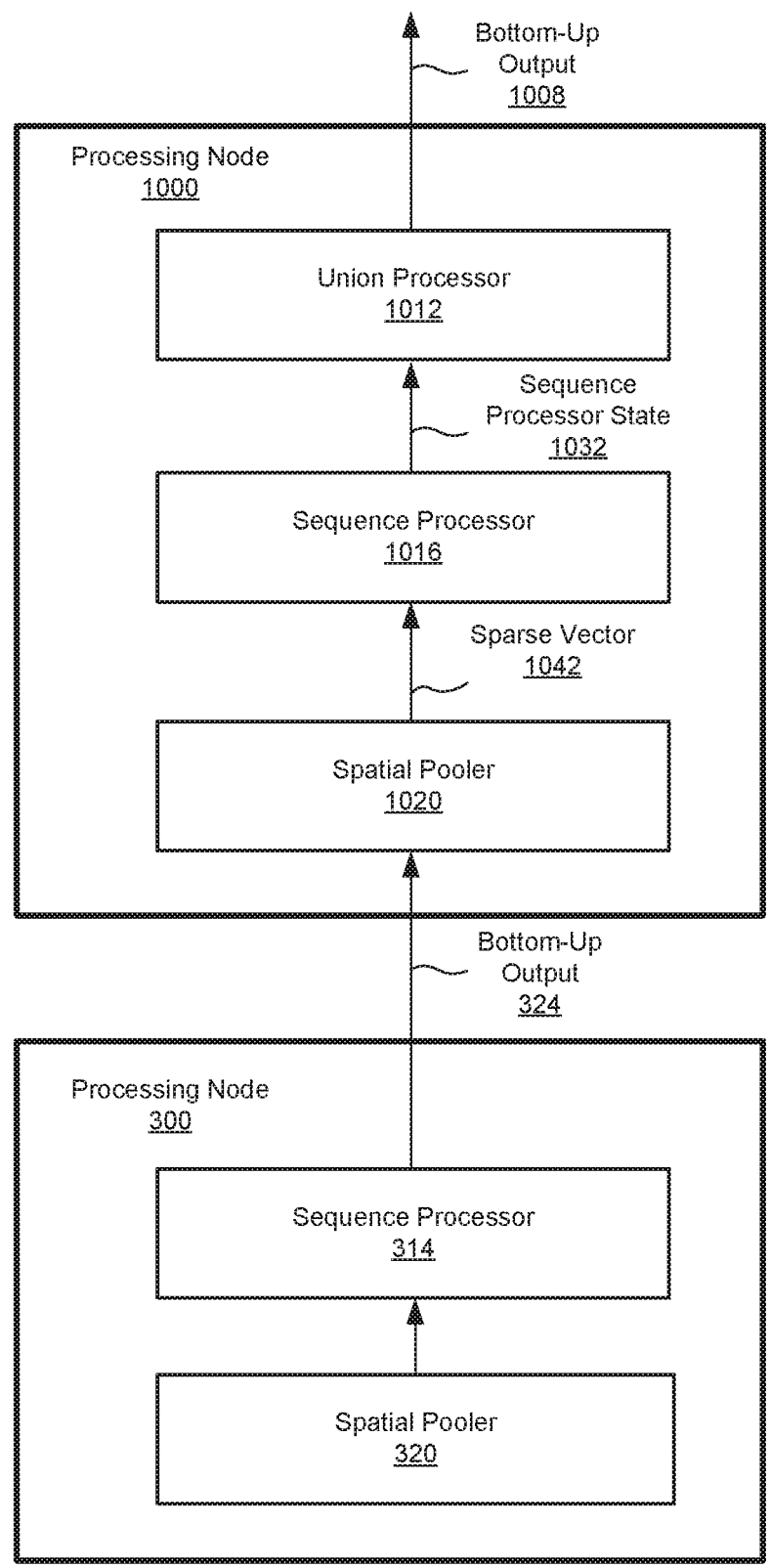
FIG. 11A is a block diagram illustrating a hierarchy of processing nodes including an upper processing node with a union processor, according to another embodiment.

FIG. 11A is a block diagram illustrating a hierarchy of processing nodes, according to another embodiment. The hierarchy of processing nodes includes a lower processing node 300 and an upper processing node 1000. The upper processing node 1000 is connected to the lower processing node 300 to receive bottom-up output 324. The upper processing node 1000 may include, among other components, a union processor 1012, a sequence processor 1016, and a spatial pooler 1020.

Compared to the embodiment of FIG. 10A, the embodiment of FIG. 11A includes the additional component of the sequence processor 1014 which feeds the sequence processor state 1032 to the union processor 1012. The sequence processor 1014 may have the same structure and function as the sequence processor 314 described above in detail with reference to FIG. 6. Distinct from the embodiment in FIG. 10A, union elements in the union processor 1012 of FIG. 11A is associated with a subset of cells in the sequence processor 1016. Each of the union elements in the union processor 1012 may have a one-to-one mapping relationship with the cells in the sequence processor 1016. Alternatively, the union elements may have one-to-multiple mapping relationship with the cells in the sequence processor 1016 (where multiple cells in the sequence processor 1016 are mapped to one union element).

Union processor 1012 receives sequence processor states 1032 from the sequence processor 1016, performs a predetermined temporal pooling process, and sends bottom-up output 1008 indicating which union elements in the union processor 1012 are active. Bottom-up output 1008 may be fed to a parent node, to another processing node, or to any other component (not shown) for further processing.

Each of the union elements may be assigned with a persistence score that depends on the activation states of the associated cells in the sequence processor 1016. The union element is activated if its persistence score meets a predetermined criterion, and stays activated beyond the current time step as long as the criterion is satisfied. Similar to the embodiment in FIG. 10A, the union elements of the union processor 1012 in FIG. 11A unionize the activation states of the cells of sequence processor 1016 over time to generate a more stable output.

Figure 11B:
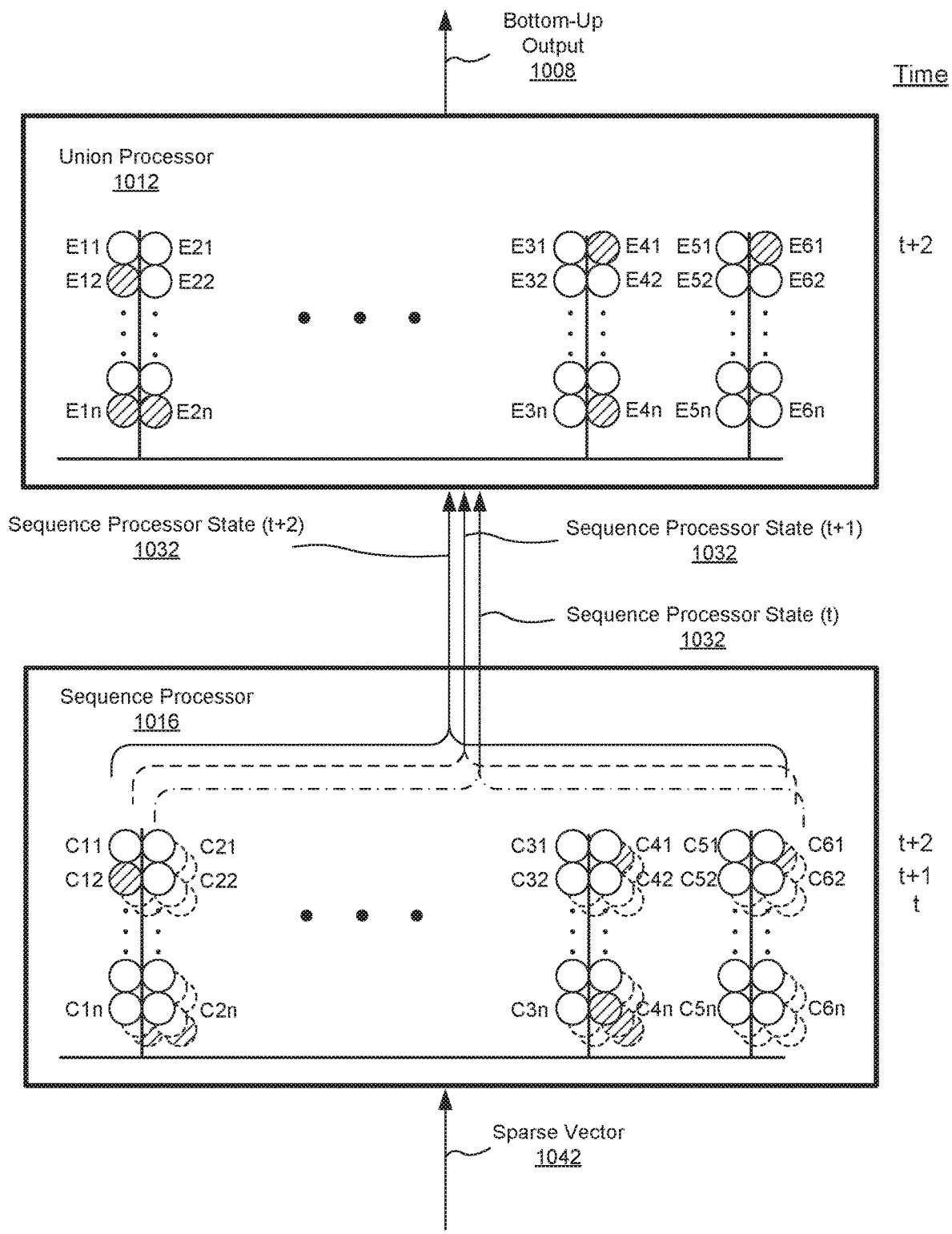
FIG. 11B is a conceptual diagram illustrating the operation of a processing node including the union processor of FIG. 11A, according to one embodiment.

FIG. 11B is an example illustrating operation of the union processor 1012 in FIG. 11A. Union elements E11 through E6$n$ of the union processor 1012 are associated with corresponding cells C11 through C6$n$ in the sequence processor 1016. From time t to t+2, the sequence processor 1016 outputs a series of sequence processor states 1032 to the union processor 1012 that indicate the activation states of the cells C11 through C6$n$ in the sequence processor 1016. For example, cells C1$n$, C2$n$, and C4$n$ are active at time t, cells C41, C4$n$, and C61 are active at time t+1, and cells C12 and C4$n$ are active at time t+2. Although FIG. 11B illustrates only 6 columns of cells and union elements, this is merely for the sake of explanation and there can be many more columns of cells and union elements in practical applications.

The persistence score for a union element is changed depending on the activation of an associated cell in the sequence processor 1016. In one embodiment, the persistence score of a union element is increased when the associated cell of the sequence processor 1016 is activated. For example, in FIG. 11B, the persistence score of union element E4$n$ in the union processor 1012 is increased at time t, when the sequence processor state 1032 at time t indicates that cell C4$n$ in the sequence processor 1016 is activated.

Conversely, the persistence score for a union element is decreased over time at a predetermined rate when the associated cells of the sequence processor 1016 remain inactive. For example, in FIG. 11B, the persistence score of union element E2$n$ in the union processor 1012 is decreased at times t+1 and t+2 because a corresponding cell C2$n$ in the sequence processor 1016 is not active at times t+1 and t+2. The amount of decrease in the persistence score may be determined based on, for example, a decaying exponential function.

As in the embodiment in FIG. 10A, the union elements in the union processor 1012 in FIG. 11A are activated and remain active beyond the current time step as long as the persistence scores satisfy a predetermined criterion. As discussed in reference to FIG. 10A, the criterion may require the persistence score to be above a threshold, or may require a maximum sparsity on the activation states of the union processors.

As in the embodiment in FIG. 10A, the union processor 1012 in FIG. 11A enables a more stable representation of sequence patterns by maintaining the activation states of union elements beyond the current time step, and may also provide the bottom-up output 1008 to sequence processors and/or spatial poolers in any processing node including the processing node 1000. Similar to the union processor 1012 in FIG. 10A, the union elements in the union processor 1012 in FIG. 11A may provide their activation states to cells of a sequence processor or sparse vector elements of a spatial pooler in any processing node including processing node 1000. However, the union processor 1012 in FIG. 11A allows a further increase in activation time for union elements that are associated with a higher proportion of PACs. The high number of PACs indicates that a temporal sequence of patterns learned by the union element was correctly predicted, and hence, the union element may continue to influence the HTM by remaining active for a longer period of time.

In one embodiment, a union element in the union processor 1012 is associated with two or more cells of the sequence processor 1016. In such embodiment, the number of predicted active cells (PACs) or a proportion of PACs relative to active cells not previously predicted for activation may be used to obtain a weighted sum. If the weighted sum is above a threshold, the persistence score for the union element may be increased. Further, the amount of increase in the persistence score for a union element may be greater if it is associated with a higher number or proportion of predicted active cells relative to active cells not predicted for activation. For example, the amount of increase in the persistence score for a union element associated with a predicted active (PAC) cell is larger than the amount of increase for another union element associated with a cell that was activated but was not previously predicted to become active. As another example, the amount of increase in the persistence score assigned to a union element may be determined by the proportion or number of PACs associated with the union element. For example, the amount of increase in the persistence score of a union element may be a function of the proportion of PACs associated with the union element. Similarly, the persistence score of the union element may be decreased if the weighted sum of the proportion or number of predicted active cells (PACs) is below a threshold.

In another embodiment, instead of using persistent scores, an activated union element remains active over a predetermined number of time steps when a co-occurrence detector mapped to the union element is activated. For example, after a union element is activated, it remains active for three consecutive time steps. If the associated co-occurrence detector or cell turns active while the union element is active, the activation of union element is extended over the subsequent three time steps.

Figure 12:
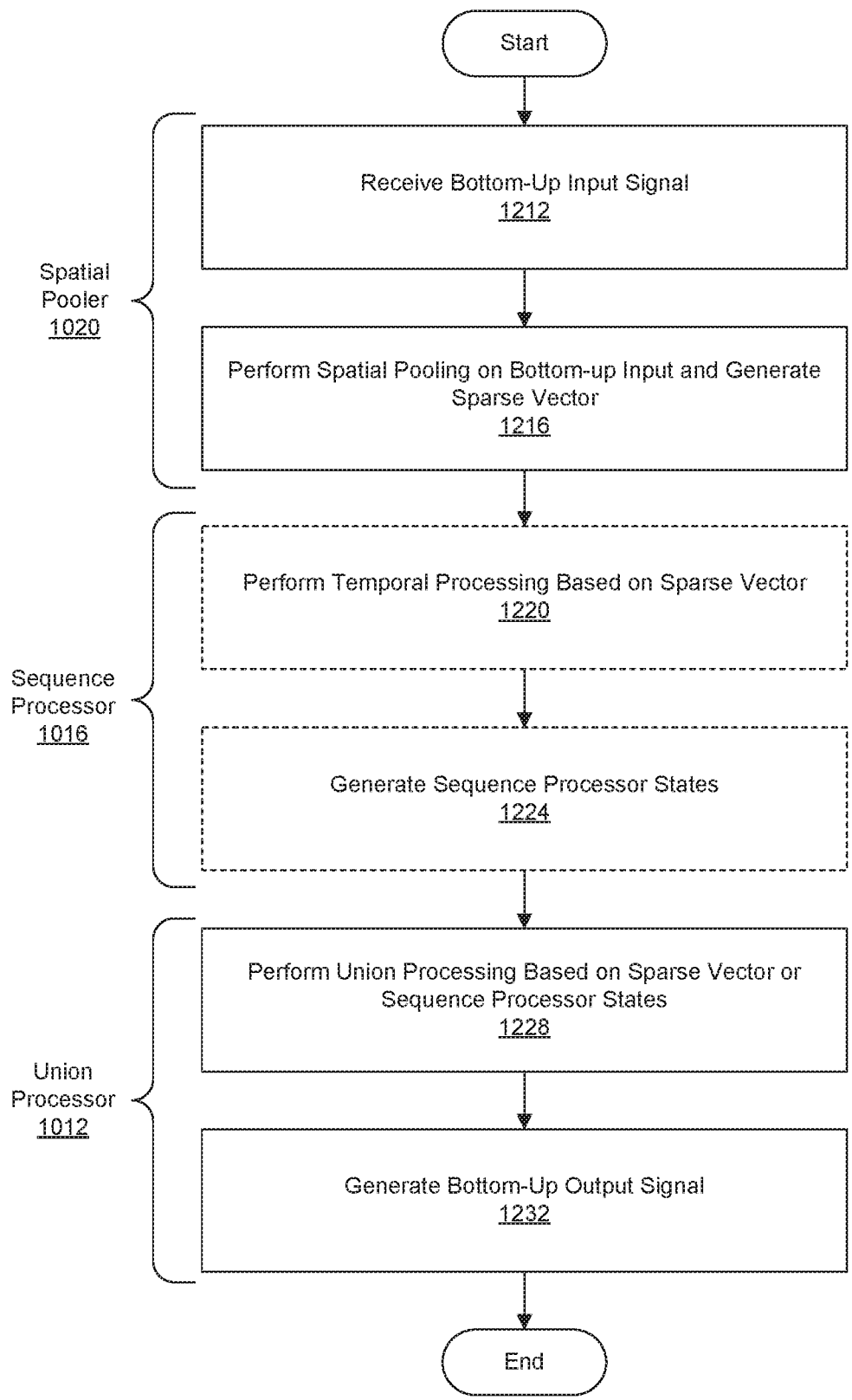
FIG. 12 is a flowchart illustrating an overall process in a processing node including a union processor, according to one embodiment.

FIG. 12 is a flowchart illustrating an overall process in a processing node including a union processor, according to one embodiment. The spatial pooler 1020 receives 1212 bottom-up input signal from a lower processing node. The spatial pooler 1020 performs 1216 spatial pooling on the bottom-up input and outputs a sparse vector.

If the processing node does not include a sequence processor, the union processor 1012 performs 1228 union processing based on the sparse vector received from the spatial pooler 1020. The union processor 1012 generates 1232 a bottom-up output signal indicating active states of the union elements.

If the processing node includes a sequence processor 1016, the sequence processor 1016 performs 1220 temporal processing based on the received sparse vector from the spatial pooler 1020. As a result, the sequence processor 1016 generates 1224 sequence processor states indicating activation states of the cells in the sequence processor 1016. The union processor 1012 performs 1228 union processing based on the received sequence processor states and generates 1232 the bottom-up output signal indicating active states of the union elements.

Figure 13:
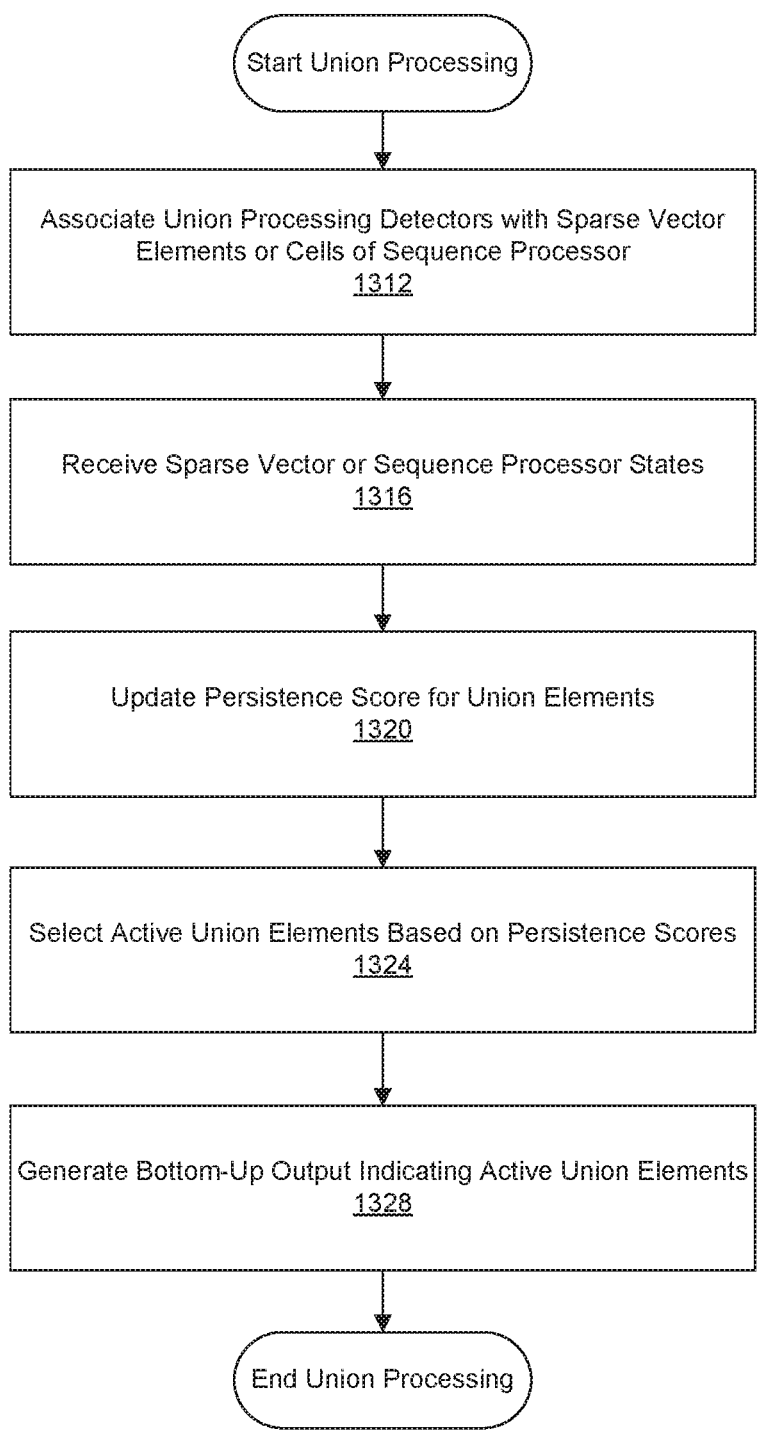
FIG. 13 is a flowchart illustrating a method of performing union processing in a processing node, according to one embodiment.

FIG. 13 is a flowchart illustrating a method of performing union processing in a processing node, according to one embodiment. Each union element is associated with 1312 or mapped to a subset of sparse vector elements or a subset of cells from a sequence processor. The union processor receives 1316 activation states of sparse vector elements or activation states of cells in the sequence processor.

The persistence score for a union element is updated 1320 based on the activation states of the elements or cells associated with the union element. A subset of union elements is selected 1324 to be active based on their persistence scores. The union processor generates 1328 bottom-up output indicating active states of the union elements.

Figure 14:
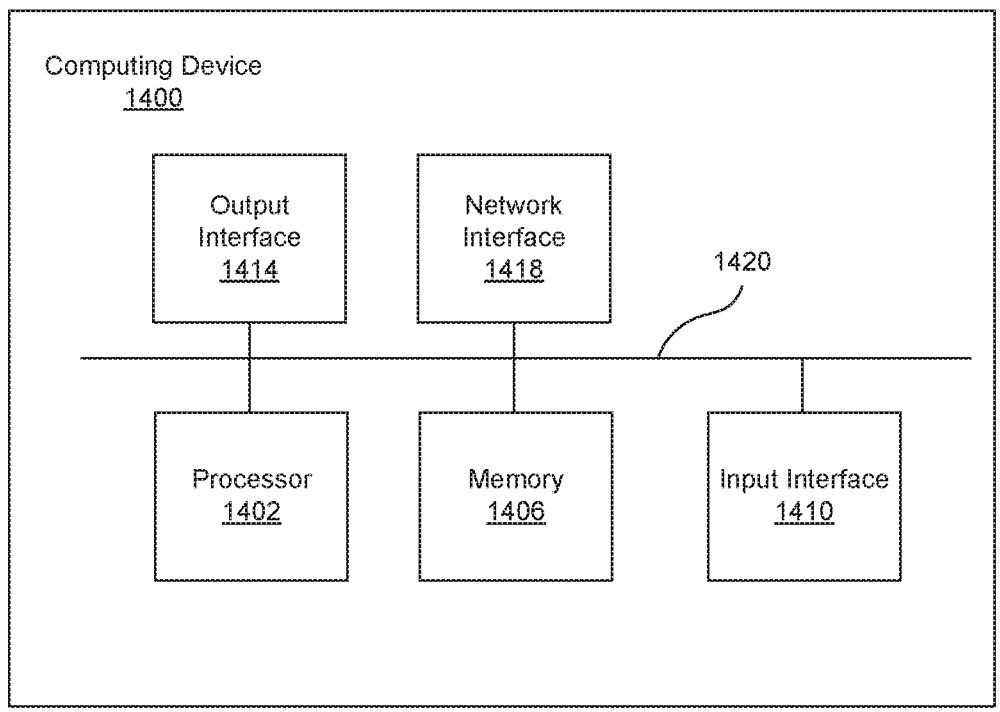
FIG. 14 is a block diagram of a computing device for implementing processing nodes according to embodiments.

FIG. 14 is a block diagram of a computing device 1400 for implementing nodes according to embodiments. The computing device 1400 may include, among other components, a processor 1402, a memory 1406, an input interface 1410, an output interface 1414, a network interface 1418 and a bus 1420 connecting these components. The processor 1402 retrieves and executes commands stored in memory 1406. The memory 1406 store software components including, for example, operating systems and modules for instantiating and executing nodes as described herein. The input interface 1410 receives data from external sources such as sensor data or action information. The output interface 1414 is a component for providing the result of computation in various forms (e.g., image or audio signals). The network interface 1418 enables the computing device 1400 to communicate with other computing devices by a network. When multiple nodes or components of a single node is embodied in multiple computing devices, information associated with temporal sequencing, spatial pooling and management of nodes may be communicated between computing devices via the network interface 1418.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A computer-implemented method, comprising:
   receiving input data for a first time, the input data having a plurality of input elements;
   generating a first vector by performing spatial pooling on the input data for the first time the first vector generated by selecting a first subset of elements in the first vector to be activated based on activated input elements of the input data for the first time mapped to the first subset of elements in the first vector, activation of the first subset of elements indicated in sparse distributed representation;
generating first output data indicating activation of a first subset of output elements, the first subset of output elements activated based on the selected first subset of elements in the first vector;
receiving input data for a second time subsequent to the first time, the input elements activated in the input data for the second time different from the input elements activated in the input data for the first time;
generating a second vector by performing spatial pooling on the input data for the second time, the second vector generated by selecting a second subset of elements in the second vector to be activated based on the activation of the input elements in the input data for the second time mapped to the second subset of elements in the second vector, the activation of the second subset of elements indicated in sparse distributed representation; and
generating second output data indicating unionized activation of the first subset of output elements and a second subset of the output elements different from the first subset of output elements, the second subset of output elements activated based on the selected second subset of elements in the second vector.

2. The method of claim 1, wherein each of the output elements in the first subset of output elements is mapped to a corresponding subset of elements in the first vector, an output element in the first subset of output elements activated responsive to a predetermined number or portion of the mapped corresponding subset of elements in the first vector being activated.

3. The method of claim 1, wherein the first subset and the second subset of output elements remain active for a predetermined number of time steps.

4. The method of claim 1, wherein each of the output elements in the first subset of output elements is mapped to a corresponding plurality of elements in the first vector.

5. The method of claim 1, further comprising:
updating a sequence processor to a first state responsive to the activation of the first subset of elements in the first vector;
generating first state information representing the updated first state of the sequence processor and indicative of detection or prediction of temporal sequences in the input data of the first time, the first subset of output elements activated based on activation of elements in the first state information mapped to the first subset of output elements;
updating the sequence processor to a second state responsive to the activation of the second subset of elements in the second vector; and
generating second state information representing the updated second state of the sequence processor, the second subset of output elements activated based on activation of elements in the second state information mapped to the second subset of output elements.

6. The method of claim 5, wherein the first state information of the sequence processor is represented by activation of a first subset of one or more cells in the sequence processor, wherein the second state information of the sequence processor is represented by activation of a second subset of the one or more cells, and wherein the activation states of the one or more cells in the first state information and the second state information are indicative of detection or prediction of the temporal sequences in the input data.

7. The method of claim 5, wherein an output element in the first subset of output elements is activated responsive to a predetermined number or portion of one or more cells mapped to the output element in the first subset of output elements being activated.

8. The method of claim 7, wherein the output element in the first subset of output elements is activated further based on a ratio of the activated cells that contributed to correctly predicting the temporal sequences in the input data relative to the activated cells that did not contribute to correctly predicting the temporal sequences in the input data.

9. The method of claim 5, wherein each of the elements of the first vector is mapped to a plurality of cells in the sequence processor.

10. The method of claim 1, wherein each of the activated output elements in the first subset and the second subset of output elements has a persistence score that meets a predetermined criterion, each of the activated output elements remaining active based on a rate of change in the persistence score after a selected element in the second subset of elements in the second vector is deactivated at a third time subsequent to the second time.

11. The method of claim 10, wherein generating the second output data comprises:
increasing the persistence score of an output element in the first subset of output elements responsive to at least a predetermined number or portion of a subset of elements in the first vector mapped to the output element in the first subset of output elements or a subset of cells in a sequence processor being activated; and
decreasing the persistence score of a second output element in the first subset of output elements responsive to less than the predetermined number or portion of another subset of elements in the first vector mapped to the second output element in the first subset of output elements or another subset of cells in the sequence processor being activated,
wherein the predetermined criterion is that the persistence score of each of the activated output elements is above a threshold.

12. The method of claim 1, wherein the input data is generated by spatial pooling and temporal processing of another input data.

13. A computer-implemented method, comprising:
receiving input data for a first time having a plurality of input elements;
updating a sequence processor to a first state responsive to receiving the input data for the first time;
generating first state information representing the updated first state of the sequence processor and indicative of detection or prediction of temporal sequences in the input data of the first time, the first state information indicating activation of a first subset of elements based on at least the activation of the input elements in the input data for the first time; and
generating first output data indicating activation of a first subset of output elements, the first subset of output elements activated based on the activation of the first subset of elements of the first state information mapped to the first subset of output elements;
receiving the input data for a second time subsequent to the first time, activated input elements in the input data for the second time different from activated input elements in the input data for the first time;
updating the state of the sequence processor to a second state responsive to receiving the input data for the second time;

generating second state information representing the updated second state of the sequence processor, the second state information indicating activation of a second subset of elements based on at least the activation of the input elements in the input data for the second time; and generating second output data indicating unionized activation of the first subset of output elements and a second subset of the output elements different from the first subset of output elements, the second subset of output elements activated based on the activation of the second subset of elements of the second state information mapped to the second subset of output elements.

14. The method of claim 13, wherein each of the activated output elements in the first subset of output elements is mapped to a corresponding subset of elements in the sequence processor, an output element in the first subset of output elements activated responsive to a predetermined number or portion of the mapped corresponding subset of elements in the sequence processor being activated.

15. The method of claim 13, wherein the first subset and the second subset of output elements remain active for a predetermined number of time steps.

16. The method of claim 13, wherein each of the output elements in the first subset of output elements is mapped to a plurality of elements in the sequence processor.

17. The method of claim 13, wherein the first state information of the sequence processor is represented by activation of a first subset of one or more cells in the sequence processor, wherein the second state information of the sequence processor is represented by a second subset of the one or more cells, and wherein the activation states of the one or more cells indicative of detection or prediction of the temporal sequences in the input data.

18. The method of claim 17, wherein an output element in the first subset of output elements is activated responsive to a predetermined number or portion of the one or more cells mapped to the output element being activated.

19. The method of claim 18, wherein the output element in the first subset of output elements is activated further based on a ratio of the activated cells that contributed to correctly predicting the temporal sequences in the input data relative to the activated cells that did not contribute to correctly predicting the temporal sequences in the input data.

20. The method of claim 13, wherein each of the activated output elements in the first subset and the second subset of output elements has a persistence score that meets a predetermined criterion, each of the activated output elements remaining active based on a rate of change in the persistence score after a selected element in the second subset of elements in the sequence processor is deactivated at a third time subsequent to the second time.

21. The method of claim 20, wherein generating the second output data comprises:
increasing the persistence score of an output element in the first subset of output elements responsive to at least a predetermined number or portion of a subset of elements in the sequence processor mapped to the output element in the first subset of output elements being activated; and
decreasing the persistence score of a second output element in the first subset of output elements responsive to less than the predetermined number or portion of another subset of elements in the sequence processor mapped to the second output element being activated, wherein the predetermined criterion is that the persistence score of each of the activated output elements is above a threshold.

22. A computing device including a non-transitory computer readable storage medium comprising instructions configured to be executed by a processor, the instructions when executed by the processor cause the processor to:
receive input data for a first time, the input data having a plurality of input elements, and
generate a first vector by performing spatial pooling on the input data for the first time, the first vector generated by selecting a first subset of elements in the first vector to be activated based on activated input elements of the input data for the first time mapped to the first subset of elements in the first vector, activation of the first subset of elements indicated in sparse distributed representation;
generate first output data indicating activation of a first subset of output elements, the first subset of output elements activated based on the selected first subset of elements in the first vector;
receive input data for a second time subsequent to the first time, the input elements activated in the input data for the second time different from the input elements activated in the input data for the first time; and
generate a second vector by performing spatial pooling on the input data for the second time, the second vector generated by selecting a second subset of elements in the second vector to be activated based on the activation of the input elements in the input data for the second time mapped to the second subset of elements in the second vector, the activation of the second subset of elements indicated in sparse distributed representation; and
generate second output data indicating unionized activation of the first subset of output elements and a second subset of the output elements different from the first subset of output elements, the second subset of output elements activated based on the selected subset of elements in the second vector.

23. The computing device of claim 22, wherein each of the output elements in the first subset of output elements is mapped to a corresponding subset of elements in the first vector, an output element in the first subset of output elements activated responsive to a predetermined number or portion of the mapped corresponding subset of elements in the first vector being activated.

24. The computing device of claim 22, wherein the first subset and the second subset of output elements remain active for a predetermined number of time steps.

25. The computing device of claim 22, wherein each of the output elements in the first subset of output elements is mapped to a corresponding plurality of elements in the first vector.

26. The computing device of claim 22, wherein the instructions when executed by the processor further cause the processor to:
receive the activation of the first subset of elements in the first vector,
generate first state information indicating detection or prediction of temporal sequences in the input data of the first time, the first subset of output elements activated based on activation of elements in the first state information mapped to the first subset of output elements;

receive the activation of the second subset of elements in the second vector; and generate second state information, the second subset of output elements activated based on activation of elements in the second state information mapped to the second subset of output elements.

27. The computing device of claim 26, wherein the first state information of the sequence processor is represented by activation of a first subset of one or more cells in the sequence processor, wherein the second state information of the sequence processor is represented by activation of a second subset of the one or more cells, and wherein the activation states of the one or more cells in the first state information and the second state information are indicative of detection or prediction of the temporal sequences in the input data.

28. The computing device of claim 26, wherein the instructions when executed by the processor further cause the processor to activate an output element in the first subset of output elements responsive to a predetermined number or portion of one or more cells mapped to the output element in the first subset of output elements being activated.

29. The computing device of claim 28, wherein the instructions when executed by the processor further cause the processor to activate the output element in the first subset of output elements further based on a ratio of the activated cells that contributed to correctly predicting the temporal sequences in the input data relative to the activated cells that did not contribute to correctly predicting the temporal sequences in the input data.

30. The computing device of claim 26, wherein each of the elements of the first vector is mapped to a plurality of cells in the sequence processor.

31. The computing device of claim 22, wherein each of the activated output elements in the first subset and the second subset of output elements has a persistence score that meets a predetermined criterion, each of the activated output elements remaining active based on a rate of change in the persistence score after a selected element in the second subset of elements in the second vector is deactivated at a third time subsequent to the second time.

32. The computing device of claim 31, wherein the instructions when executed by the processor further cause the processor to:
increase the persistence score of an output element in the first subset of output elements responsive to at least a predetermined number or portion of a subset of elements in the first vector mapped to the output element in the first subset of output elements or a subset of cells in a sequence processor being activated; and
decrease the persistence score of a second output element in the first subset of output elements responsive to less than the predetermined number or portion of another subset of elements in the first vector mapped to the second output element in the first subset of output elements or another subset of cells in the sequence processor being activated,
wherein the predetermined criterion is that the persistence score of each of the activated output elements is above a threshold.

33. A computing device including a non-transitory computer readable storage medium comprising instructions configured to be executed by a processor, the instructions when executed by the processor cause the processor to:
receive input data for a first time having a plurality of input elements, update a sequence processor to a first state responsive to receiving the input data for the first time, generate first state information representing the updated first state of the sequence processor and indicative of detection or prediction of temporal sequences in the input data of the first time, the first state information indicating activation of a first subset of elements based on at least the activation of the input elements in the input data for the first time, generate first output data indicating activation of a first subset of output elements, the first subset of output elements activated based on the activation of the first subset of elements of the first state information mapped to the first subset of output elements, receive the input data for a second time subsequent to the first time, activated input elements in the input data for the second time different from activated input elements in the input data for the first time, update the sequence processor to a second state responsive to receiving the input data for the second time, generate second state information representing the updated second state of the sequence processor, the second state information indicating activation of a second subset of elements based on at least the activation of the input elements in the input data for the second time;
and generate second output data indicating unionized activation of the first subset of output elements and a second subset of the output elements different from the first subset of output elements, the second subset of output elements activated based on the activation of the second subset of elements of the second state information mapped to the second subset of output elements.

34. A non-transitory computer readable storage medium comprising instructions configured to be executed by a processor, the instructions when executed by the processor cause the processor to:
receive input data for a first time, the input data having a plurality of elements;
generate a first vector by performing spatial pooling on the input data for the first time, the first vector generated by selecting a first subset of elements in the first vector to be activated based on activated input elements of the input data for the first time mapped to the first subset of elements in the first vector, activation of the first subset of elements indicated in sparse distributed representation;
generate first output data indicating activation of a first subset of output elements, the first subset of output elements activated based on the selected first subset of elements in the first vector;
receive input data for a second time subsequent to the first time, the input elements activated in the input data for the second time different from the input elements activated in the input data for the first time;
generate a second vector by performing spatial pooling on the input data for the second time, the second vector generated by selecting a second subset of elements in the second vector to be activated based on the activation of the input elements in the input data for the second time mapped to the second subset of elements in the second vector, the activation of the second subset of elements indicated in sparse distributed representation; and
generate second output data indicating unionized activation of the first subset of output elements and a second subset of the output elements different from the first subset of output elements, the second subset of output elements activated based on the selected second subset of elements in the second vector.

35. A non-transitory computer readable storage medium comprising instructions configured to be executed by a processor, the instructions when executed by the processor cause the processor to:

receive input data for a first time having a plurality of input elements;

update a sequence processor to a first state responsive to receiving the input data for the first time;

generate first state information representing the updated first state of the sequence processor and indicative of detection or prediction of temporal sequences in the input data of the first time, the first state information indicating activation of a first subset of elements based on at least the activation of the input elements in the input data for the first time; and generate first output data indicating activation of a first subset of output elements, the first subset of output elements activated based on the activation of the first subset of elements of the first state information mapped to the first subset of output elements receive the input data for a second time subsequent to the first time, activated input elements in the input data for the second time different from activated input elements in the input data for the first time;

update the state of the sequence processor to a second state responsive to receiving the input data for the second time;

generate second state information representing the updated second state of the sequence processor, the second state information indicating activation of a second subset of elements based on at least the activation of the input elements in the input data for the second time; and generate second output data indicating unionized activation of the first subset of output elements and a second subset of the output elements different from the first subset of output elements, the second subset of output elements activated based on the activation of the second subset of elements of the second state information mapped to the second subset of output elements.

* * * * *